3,166,527
ANTI-CORROSION, AMINO-ORGANOSILICON-EPOXY FINISHING COMPOSITIONS
Hans H. Ender, Buffalo, N.Y., assignor to Union Carbide Corporation, a corporation of New York
No Drawing. Filed Oct. 3, 1960, Ser. No. 59,857
40 Claims. (Cl. 260—33.2)

My invention relates to novel amino-organosilicon epoxy finishing compositions for treating metal surfaces to improve their resistance to corrosion and to a process for their preparation; to a process for treating metal surfaces with said compositions; and to articles of manufacture treated with said compositions.

It has been found that by treating a metal surface with an amino-organosilicon epoxy composition containing: (1) an amino-organosilicon compound having the amino group connected to silicon through at least three interconnected carbon atoms, (2) an epoxy compound having at least one oxirane oxygen attached to vicinal carbon atoms; and (3) a volatile organic diluent which serves as a solvent for the amino-organosilicon compound and the epoxy compound, the metal so treated is rendered surprisingly resistant to corrosion under a wide variety of wet and dry conditions.

The compositions of my invention are denominated herein as "finishing" compositions and possess remarkably superior properties in protecting metals from corrosion as compared to such conventional coating compositions as, for example, epoxy and vinyl coating compositions. By way of illustration, metals can be treated or "finished" with the compositions of my invention to produce extremely thin films or "finishes" (e.g., films as thin as 0.005 mil) which afford greater protection for the metal than is achieved with the relatively thick coatings produced by treating metals with conventional vinyl or epoxy coating compositions.

As a further illustration, when the films or finishes produced by treating or finishing metals with the finishing compositions of this invention become scratched or suffer other local mechanical penetration, they continue to protect the surface of the treated or finished metal (except only for the surface area exposed by the scratch or other local penetration) from corrosion. On the other hand, when the coatings produced by treating metals with conventional vinyl or epoxy coating compositions become scratched or suffer other local penetration, they cease to afford protection, not only to the surface exposed by the scratch of local penetration, but also to the area remaining coated in that corrosion spreads underneath the coating. Consequently, the extremely thin films denominated herein as finishes appear to be essentially different in nature from the coatings produced from conventional organic coating compositions.

It is, of course, well known that the resistance to corrosion of metallic surfaces can be improved by coating the surfaces with organic materials which themselves resist corrosion, such as lacquers, paints, shellacs, dopes, and other like materials. These materials provide a certain amount of protection against corrosion of surfaces to which they have been applied. In his endless struggle against the destructive forces of nature, man is constantly seeking new and better materials for protecting metallic manufactured goods agains the degradative forces imposed on such goods by nature or even by man himself. Heretofore, organic coating materials have lacked at least one, and usually more than one, important property requisite for the efficient protection against degradative conditions.

While a particular material may be inert under degradative conditions, it may not at the same time be capable of adequately bonding to the surfaces to be protected, and thus fails as a protective coating. Conversely, other materials which may bond adequately, may be entirely unstable under degradative conditions. Still other materials must be applied in extremely thick coatings (e.g., several mils) in order to provide any protection whatsoever and thus are prone to cracking and crazing under mechanical or thermal stress. Other corrosion resistant materials, such as tars and asphalts, because of their unsightliness are entirely unsuitable for special uses such as the coating of decorative surfaces, e.g., metal plaques, silverware, chrome decoration, metal doorknobs, railings and the like.

The usefulness of aminoalkylsilicones films alone as corrosion inhibitors for a large number of metallic surfaces such as steel, copper, silver, brass, zinc, aluminum, and the like has been previously demonstrated even when very thin films are applied. These aminoalkylsilicones are very effective in preventing corrosion in a substantially dry environment but, when the metal is to be exposed to wet corrosive environments, it is necessary to set the aminoalkylsilicon film on the metal by heat-curing to obtain a useful degree of corrosion resistance. However, although this heat-curing does provide corrosion resistance under wet or moist conditions, my amino-organo-silicon-epoxy compositions herein disclosed are superior thereto and provide excellent corrosion resistance under more corrosive aqueous conditions. For example, a 0.03 to 0.05 mil film of gamma-aminopropyl-phenylsilicone [$NH_2(CH_2)_3SiO_{3/2}.\phi SiO_{3/2}$] when heat-cured on steel will protect the steel for only about three hours in the severely corrosive atmosphere of a 3 percent aerated salt solution, after which time film breakdown slowly occurs and is complete in about 16 hours. My compositions will protect steel two or more times as long under similar conditions.

The use of organic amines, particularly the high molecular weight organic amines, as corrosion inhibitors is known. In most instances, they are dissolved in a suitable solvent and are applied by coating or spraying on metal surfaces. Among the organic amines employed for this purposes are hexadecylamine, octadecylamine, N-octadecylpropylenediamine-1,3, as well as their fatty acid derivatives. However, the use of organic amines and the like as corrosion inhibitors for metals has left much to be desired. By way of illustration, while the organic amines furnish some degree of protection against corrosion to certain few metals under atomospheric conditions, they have been ineffective as corrosion inhibitors at elevated temperatures for any metal. For example, the ferrous metals when coated with these compounds, such as N-octadecylpropylenediamine-1,3, are resistant to corrosion under atmospheric conditions. However, when the coated metals are subjected even briefly to elevated temperatures, such as 15 minutes at 150° C., the corrosion inhibiting properties of the organic amines are lost. These organic amines are thermally unstable at elevated temperatures, and readily decompose. As coatings, the organic amines, furthermore, fail to provide protection from corrosion under wet or moist conditions and readily break down when exposed to such conditions. Also, it is to be emphasized that these amines are not effective with other metals, as for example, copper and its alloys, since these amines promote corrosion thereof.

It has also been shown heretofore that bi- and polyfunctional epoxy compounds, also known as epoxy resins, i.e., the polyglycidyl ethers of polyhydric phenols, form coating films if a suitable catalyst, usually a di- or polyamino organic compound, is added. These epoxy coatings exhibit corrosion resistance against water, detergents and certain other corrosive agents and are being commercially employed as protective coatings for such metals as silver, steel and the like. Although epoxy coatings themselves are resistant to corrosion under many degradative conditions, they must be applied in relatively thick coatings (of the order of about 0.5 mil) in order to be effective in protecting metals or the like from corrosion. When applied in thinner coatings (e.g., about 0.1 mil), epoxies are not effective in protecting metal substrates. The effective, thicker epoxy coatings exhibit a yellowish color and thus are not completely suitable in protecting metal surfaces wherein the innate, decorative appearance of the metal is to be retained. For example, in protecting silverware from tarnishing epoxy coatings applied in effective thicknesses give a yellowish and/or unsightly appearance to the coated silverware. Additionally, it has been found that epoxy coatings, even in the effective thickness, separate from the coated substrate under many adverse conditions, e.g., when immersed in hot or boiling water, or when the adverse conditions vary in severity. Separation of epoxy coatings from substrates has been experienced particularly when subjected to environments which cyclically change from mild to severe, for example, when the coated substrate is continuously subjected to the cycle of exposure to high humidity or salt or fresh water followed by exposure to dry conditions.

Coating films have also been formed on metals with vinyl chloride polymers. However, film thicknesses of up to 2.0 mils are required to achieve satisfactory corrosion protection with such polymers.

Accordingly, it is an object of this invention to provide a process for improving the corrosion resistance of articles, particularly those articles which are readily oxidized, tarnished or discolored, such as aluminum, steel, copper and silver, their alloys and other metals including their alloys.

It is another object of this invention to provide finishing compositions which when applied to metallic surfaces are curable at ambient temperatures to form well bonded, mechanically strong films which are stable and protective toward the surface under a wide variety of severely corrosive conditions, and which can be, as desired, applied in extremely thin thicknesses (as low as about 0.005 mil) and still retain corrosion resistance or in thickness ranges up to one mil or higher. A closely related object is to provide a process for producing such coating compositions.

A further object of our invention is to provide a finished article which will withstand material degradation of the finish or finished surface thereof under a wide spectrum of severely corrosive conditions.

My finishing compositions are curable at ambient temperatures and below. They need not be raised to elevated temperatures in order to be cured, although elevated temperatures can be used, if desired. They can be termed air-drying and air-curing inasmuch as once applied to an object they dry and cure without the necessity of positively imposing any further physical or chemical drying and curing inducements, such as heat, pressure, catalyst and the like, thereon, although such promoters can be used if desired. My finishing compositions as such are remarkly stable during storage and can be made with shelf-lives which are entirely satisfactory at not only the desired application strength but also as concentrates which are diluteable as required with a wide variety of diluent systems prior to application to the metal surface. Shelf-lives of several weeks to several months have been observed in my compositions. These relatively storage-stable compositions are readily applied to metal surfaces by simply applying the composition to the metal surface. Application can be accomplished by spraying, brushing, roller coating, dipping, tumbling and the like. There are no complications in obtaining films of uniform thickness or in premature gelling, setting or curing. Films of any desired thickness are readily obtained in accordance with my invention without materially sacrificing corrosion resistance. These thin films adhere tenaciously to the metal articles on which they are formed and show no tendency to peel, powder, flake or otherwise become detached from the metal article even if small pinholes exist in the film. My process for rendering metal surfaces corrosion resistant is extremely versatile and is usable under a variety of different circumstances. The process is capable of practice under ordinary atmospheric conditions and no special precautions, such as the exclusion of air, moisture and the like or the use of inert gas blankets, need to be employed.

Metal articles having thereon a film derived from my finishing compositions have greatly improved resistance to corrosion. My finished metal articles are resistant to corrosion caused by contact with vapors, liquids, or solids which are acidic, neutral or basic in nature. The films or finishes of my finished metal articles are normally colorless and transparent (although they can be readily pigmented or dyed to provide coloring or opacity) and do not adversely affect the usual appearance of the metal article carrying said film or finish. There is no oily residual film imparted to the metal article and when the finish or film thereon is unpigmented or not dyed the metal article exhibits its normally expected appearance (except for the manifestations of improved corrosion resistance) as though it carried no finish at all. Hence, the appearance of metal articles need not be altered by the presence thereon of the films or finish produced by my invention and the normally attractive appearance of such metals as silver, copper, chromium and the like are preserved and the metals themselves are protected from deterioration.

My finishing compositions are comprised of at least one or more amino-organosilicon compound; at least one or more epoxy compound and a volatile organic diluent. In a preferred embodiment my finishing compositions comprise partially reacted mixtures or adducts of the amino-organosilicon compounds and the epoxy compounds and a volatile organic diluent. My compositions also contain, in another preferred embodiment, hydrocarbonsilicon compounds which contain no silicon bonded amino-organo groups but which are for the most part mainly composed of silicon, silicon-bonded hydrocarbon and hydrocarbonoxy groups and oxygen linkages in addition to the amino-organosilicon and epoxy compounds or adducts and the diluent. Varying amounts of additives such as anti-blush agents, pigments, resins, dyes, fillers, anti-foam agents, and other agents for developing special properties, such as improved gloss, improved mar resistance, and the like in coatings made therefrom, can be added to my compositions, as desired.

Thus, my finishing compositions essentially comprise a diluent, an amino-organosilicon compound which is an amino-organosilan having at least one amino nitrogen atom connected to silicon through not less than 3 carbon atoms and from 1 to 2 amino hydrogen atoms bonded to the nitrogen atom or an amino-organosiloxane polymer having silicon atoms interconnected by oxysilicon bonds, at least one amino nitrogen atom connected to silicon through not less than 3 carbon atoms and from 1 to 2 amino hydrogen atoms bonded to the nitrogen atom; and an epoxy compound. Although the phenomenal corrosion resistance of metals finished with even extremely thin films of my compositions cannot be explained with certainty at this time, I believe that a unique type of chelating action involving the surface of the metal and the silicon atoms and amino nitrogen atoms contained by my cured compositions is responsible, at least in part, for the superiority of my coatings. In this connection it is noted that at least three carbon atoms are required to separate the nitrogen and silicon atoms in order to provide the outstandingly corrosion resistant coatings obtained by the use of my compositions. However, regardless of theory or mechanics of reaction the novel compositions described herein are superior protectants for metallic surfaces.

Amino-organosilicon compounds which are employed in my compositions are compounds containing one silicon atom or more than one silicon atom interconnected with each other by silicon to oxygen to silicon linkages and one or more amino groups containing at least one nitrogen-bonded hydrogen

connected to silicon through at least three carbon atoms of a hydrocarbon group. These compounds include those represented by the formula:

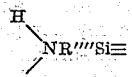

wherein R'''' is a divalent hydrocarbon group of at least three carbon atoms; the nitrogen atom is connected through at least 3 carbon atoms to the silicon atom, the unfilled valence of the nitrogen is satisfied by a monovalent organic group, e.g., hyrogen and hydrocarbon, or [—R''''Si≡] through carbon to nitrogen linkage or another aminoalkyl group; the silicon atom is bonded to one to three oxygen atoms which in turn are bonded to no other groups than hydrogen, hydrocarbon and silicon; and each remaining unfilled valence of all silicon atoms is satisfied by hydrocarbon or

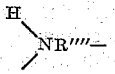

through carbon to silicon linkage and R'''' and the unfilled valence of nitrogen is satisfied as defined above.

Amino-organosilicon compounds which are particularly suitable for my compositions are the aminoalkylsilicon compounds, such as the aminoalkylsilanes and the aminoalkylpolysiloxanes, including copolymeric materials which contain both aminoalkylsiloxane units and hydrocarbonsiloxane units. Each of these classes of aminoalkylsilicon compounds contain one or more groups having the formula:

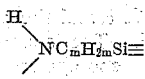

wherein $C_mH_{2m}$ is a divalent alkane group; $m$ is an integer of at least 3; the nitrogen atom is at least three carbon atoms removed from silicon; the unfilled valence of nitrogen is satisfied by a member from the class of hydrogen, hydrocarbon, aminoalkyl and —$(C_mH_{2m})Si\equiv$ through carbon to nitrogen linkage; the silicon atom is connected through one to three oxysilicon bonds to one to three members of the class of hydrogen, hydrocarbon and silicon; and each remaining unfilled valence of all silicon atoms is satisfied by a member of the class of

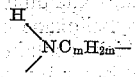

through carbon to silicon linkages and the unfilled valence of nitrogen is satisfied as defined above.

Aminoalkylsilicon compounds which are exceptionally useful in my compositions are composed of one silicon atom bonded to one to three oxygen atoms or several silicon atoms each bonded to one to three oxygen atoms and interconnected through oxysilicon bonds. There is in these compounds at least one aminoalkyl group,

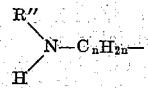

R'' and $n$ being particularly defined hereinafter, attached to silicon through silicon to carbon bondage, the amino moiety of the aminoalkyl group being attached to an alkyl carbon atom (i.e., a carbon atom of the alkyl moiety) which is at least one alkyl carbon atom removed from the alkyl carbon atom attached to silicon. The silicon bonded oxygen atom is bonded to another silicon atom or to a member from the class of hydrogen and hydrocarbon group.

Each remaining unfilled valence of silicon is satisfied by a hydrocarbon group. Typical of the hydrocarbon groups are the alkyl, aryl, alkenyl and the like groups including methyl, ethyl, amyl, phenyl, vinyl or the like. These aminoalkylsilicon compounds are represented by the formula:

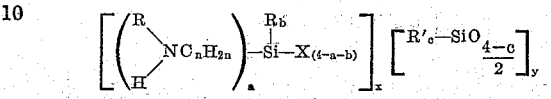

In this formula:
(1) R' is a hydrogen atom or hydrocarbon and need not be the same throughout the same molecule;
(2) R is a hydrocarbon, hydroxy or hydrocarbonoxy, preferably alkoxy or aryloxy, and need not be the same throughout the same molecule;
(3) X is hydroxy, hydrocarbonoxy, preferably alkoxy or aryloxy, or $O_{1/2}$;
(4) $n$ is an integer from 3 to 9;
(5) $a$ is an integer from 1 to 3;
(6) $b$ is an integer from 0 to 2;
(7) $c$ is an integer from 0 to 3;
(8) $a+b$ is an integer from 1 to 3;
(9) $x$ is an integer equal to one when X is hydroxy or hydrocarbonoxy and a mole fraction greater than 0, but not greater that 1, when X is $O_{1/2}$;
(10) $y$ is equal to zero when X is hydroxy or hydrocarbonoxy and a mole fraction from 0 to less than 1 when X is $O_{1/2}$;
(11) $x+y$ is equal to 1;
(12) The amino group, —NHR'', is attached to a carbon atom which is at least two carbon atoms removed from silicon, and
(13) R'' is hydrogen, hydrocarbon or R'NHC$_s$H$_{2s}$—where $s$ is an integer, preferably from 2 to 8, and where the nitrogen atom is preferably separated from the other nitrogen atom by at least two carbon atoms.

Thus, the formula illustrates aminoalkylsilanes, aminoalkylpolysiloxanes composed of only aminoalkylsiloxane units and aminoalkylsiloxane-hydrocarbonsiloxane copolymers composed of both aminoalkylsiloxane units and hydrocarbonsiloxane units, all of which being particularly useful in my compositions. These siloxanes are also hereinafter referred to as aminoalkylsilicones.

Typifying the aminoalkylsilanes which are used in my invention are those compounds represented by the structural formula:

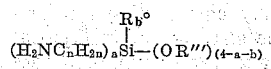

wherein R''' is hydrogen or hydrocarbon, preferably hydrogen or alkyl, such as methyl, ethyl, propyl, and butyl, and the like, R° is hydrocarbyl e.g., alkyl, aryl or aralkyl), $n$ is an integer from 3 to 9 and preferably from 3 to 4, $a$ is an integer from 1 to 3 and preferably from 0 to 1, the sum of $a+b$ is not greater than 3, and —NH$_2$ is attached to carbon which is at least two carbons removed from silicon. Illustrative of such aminoalkylsilanes are gamma-aminopropyltriethoxysilane, gamma-aminopropyltripropoxysilane, gamma-aminoisobutyltriethoxysilane, gamma-aminopropylmethyldiethoxysilane, gamma-aminopropylethyldiethoxysilane, gamma - aminopropylphenyldiethoxysilane, delta-aminobutyltriethoxysilane, delta-aminobutylmethyldiethoxysilane, delta-aminobutylethyldiethoxysilane, delta - aminobutylphenyldiethoxysilane, gamma-aminobutylmethyldiethoxysilane, gamma-aminobutyltriethoxysilane, and the like. Some of these and other aminoalkylalkoxysilanes useful in the present invention are disclosed as new compositions of matter in copending U.S. applications Serial Nos. 483,421, now U.S.P. 2,832,754; 615,466, now U.S.P. 2,930,809, and 615,480, now abandoned, filed January 21, 1955; October 12, 1956 and October 12, 1956, respectively. Processes for producing these compounds are also disclosed in said copending applications.

Typical of the aminoalkylpolysiloxanes which are used in my finishing compositions are those polysiloxanes having the formula:

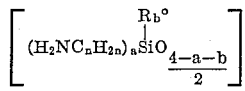

wherein $R°$, $n$, $a$, $b$ and the position of the —$NH_2$ group are as described above. Such polysiloxanes are prepared by the hydrolysis and condensation of those aminoalkylsilanes described above or by the cohydrolysis and cocondensation of mixtures of such aminoalkylalkoxysilanes and include aminoalkylpolysiloxanes of the trifunctional variety (i.e., where $a=1$ and $b=0$), aminoalkylalkylpolysiloxanes and aminoalkylarylpolysiloxanes of the difunctional variety which include cyclic or linear polysiloxanes (i.e., where $a=2$ or $a=1$ and $b=1$), and aminoalkyldialkyldisiloxanes, aminoalkyldiaryldisiloxanes and aminoalkylalkylaryldisiloxanes of the monofunctional variety (i.e., where $a=3$, $a=2$ and $b=1$ or $a=1$ and $b=2$) as well as the mixture of compounds produced by the cohydrolysis of difunctional, trifunctional and monofunctional aminoalkylsilanes.

Suitable aminoalkylpolysiloxanes of the variety which are trifunctional with respect to silicon can be more specifically depicted as having the formula:

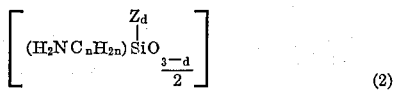 (2)

wherein $n$ and the position of —$NH_2$ are as previously described, $Z$ represents hydroxyl and/or alkoxy group, and $d$ has an average value of from 0 to 1 and can be as high as 2 but preferably from 0.1 to 1.5. Aminoalkylpolysiloxanes of this variety which are essentially free of silicon-bonded alkoxy or hydroxyl groups (i.e., where $d=0$) can be prepared by the complete hydrolysis and complete condensation of aminoalkyltrialkoxysilanes, whereas aminoalkylpolysiloxanes in which $Z$ represents predominantly silicon-bonded alkoxy groups can be prepared by the partial hydrolysis and complete condensation of the trifunctional starting silane. On the hand, aminoalkylpolysiloxanes in which $Z$ represents predominantly silicon-bonded hydroxyl groups can be prepared by the essentially complete hydrolysis and partial condensation of the starting aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable aminoalkylpolysiloxanes of the variety which are difunctional with respect to silicon, including cyclic and linear polysiloxanes, can be more specifically depicted by the formula:

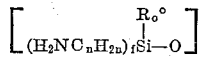

wherein $R°$, $n$ and the position of —$NH_2$ are as previously described, $f$ is an integer from 1 to 2, $e$ is an integer of 0 to 1 and $f+e$ is 2. The cyclics contain from 3 to 7 siloxane units and the linears range much higher. Such cyclic and linear aminoalkylpolysiloxanes can be prepared by the hydrolysis and condensation of aminoalkylalkyldialkoxysilanes or aminoalkylaryldialkoxysilanes. In carrying out the hydrolysis and condensation procedures there is produced a product comprising a mixture of cyclic and linear polysiloxanes which is employed as a mixture or separated to provide whatever siloxane is desired. Illustrative of the cyclic aminoalkylsiloxanes suitable for use in my finishing compositions are the cyclic tetramer of gamma-aminopropylmethylsiloxane, the cyclic tetramer of delta-aminobutylphenylsiloxane and the like. Illustrative of linear aminoalkylpolysiloxanes suitable for use in my finishing compositions are gamma-aminopropylmethylpolysiloxane, gamma-aminopropylethylpolysiloxane, delta-aminobutylmethylpolysiloxane and the like.

Included among the linear aminoalkylpolysiloxanes which are employed in my compositions are the alkyl, alkoxy and hydroxyl end-blocked polysiloxanes which contain from 1 to 3 of such endblocking groups bonded to the terminal silicon atoms of the molecules comprising the polymeric chains. Thus, I can also employ as my starting aminoalkylsilicone such linear end-blocked aminoalkylpolysiloxanes as trimethylsilyl end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylarylpolysiloxanes useful in my process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes or aminoalkylaryldiethoxysilanes. Hydroxyl end-blocked linear polysiloxanes can also be prepared by heating linear of cyclic aminoalkylpolysiloxanes with water.

Typical copolymeric aminoalkylpolysiloxanes which can be employed in my process can be depicted as having the formula:

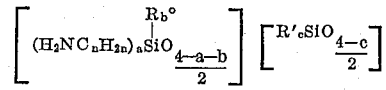

wherein $R°$, $R'$, $n$, $a$, $b$, $c$ and the position of —$NH_2$ are as previously defined. The copolymeric materials described herein include copolymers having two or more different units. The copolymers suitable for use in my compositions can contain various combinations of siloxane units such as trifunctional aminoalkylsiloxane units (where $a=1$ and $b=0$) with trifunctional hydrocarbyl, e.g., alkyl-, aryl-, olefinic-, or mixed hydrocarbyl units (where $c=1$) or with difunctional hydrocarbyl or mixed hydrocarbon siloxane units (where $c=2$). Copolymers containing other combinations of siloxane units are useful, e.g., difunctional aminoalkylsiloxane units (where $a=1$ and $b=1$ or $a=2$ and $b=0$) with trifunctional hydrocarbyl or mixed hydrocarbyl siloxane units (where $c=1$) or with difunctional hydrocarbyl siloxane units (where $c=2$).

Those polymers which contain trifunctional aminoalkylsiloxane units and other hydrocarbon siloxane units are preferably prepared by the cohydrolysis and cocondensation of the corresponding alkoxysilane starting materials. Such copolymers can contain silicon-bonded alkoxy and/or hydroxyl groups in an average amount up to about 2 and preferably in an amount up to 1.5 per silicon atom of the copolymer, or they can comprise essentially completely condensed materials. The linear and cyclic copolymeric siloxanes are prepared by the method just described or by the separate hydrolysis and condensation of an aminoalkylalkyldialkoxysilane or aminoalkylaryldialkoxysilane and the dihydrocarbyldialkoxysilanes, such as, diakyldialkoxysilane, diolefinicdialkoxysilane, alkylaryldialkoxysilane, mono-alkyl-mono-olefinic-dialkoxysilane, mono-aryl-mono-olefinic-dialkoxysilane, or diaryldialkoxysilane to form, respectively, cyclic aminoalkylsiloxanes and cyclic dihydrocarbylsiloxanes, such as, alkylarylsiloxanes, dialkylsiloxanes, diolefinicsiloxanes, mono-alkyl-mono-olefinicsiloxanes, mono-aryl-mono-olefinicsiloxanes or diarylsiloxanes, and subsequently equilibrating mixtures of such cyclic siloxanes to linear copolymers. Such linear copolymers can also contain chain-terminating or end-blocking groups such as alkyl alkoxy, or hydroxy groups.

While illustrative starting amino-organosilicon compounds have been described in detail with respect to primary aminoalkylalkoxysilanes and siloxanes, it is to be understood that the corresponding secondary aminoalkylalkoxysilanes and siloxanes can also be employed with good results. By way of illustration, secondary aminoalkylalkoxysilanes and polysiloxanes having a molecular structure corresponding to those depicted in the latter from formulae set forth above with the exception that one of the primary amino hydrogen atoms is replaced by a group such as a hydrocarbon or aminoalkyl group will, when employed in accordance with the teachings of the present invention, provide corrosion resistance to metal surfaces. Many of such secondary aminoalkylalkoxysilanes and siloxanes are disclosed in the co-pending applications referred to herein. Typical useful secondary aminoalkylalkoxysilanes and siloxanes are N-methyl-gamma-aminopropyltriethoxysilane, N-phenyl-gamma-aminoisobutylmethyldiethoxysilane, N-ethyl-delta-aminobutyltriethoxysilane, N-gamma-aminopropyl-gamma-aminopropyltriethoxysilane, N-beta-aminoethyl-gamma-aminoisobutyltriethoxysilane, N-gamma-aminopropyl-delta-aminobutyltriethoxysilane, N-omega-aminohexyl-gamma-aminoisobutylmethyldiethoxysilane, and their corresponding polymeric siloxanes as well as the copolymeric siloxanes containing hydrocarbon siloxane units.

The polymeric and copolymeric aminoalkylsiloxanes used in my compositions can be varied as to molecular weight, type and functionality of silanic-bonded hydrocarbon groups, ratio of silanic-bonded hydrocarbyl groups to silicon atoms and ratio of silanic-bonded aminoalkyl groups to silanic-bonded hydrocarbyl groups in order to develop special properties in films laid down from compositions containing them. It has been found in treating silver-surfaced objects, for example, that films cured from compositions comprising copolymeric aminoalkylsiloxanes containing from about 0.1 to 10, preferably about 0.2 to 5, and most preferably about 0.3 to 2 silanic-bonded aminoalkyl groups for each silanic-bonded hydrocarbon group are excellent in preventing sulfide tarnishing of silver plate or sterling for extremely long periods of time and are seemingly invisible to the eye. Such copolymers also provide excellent corrosion resistance to copper and copper alloy surfaces and to chrome-plated surfaces as well as to aluminum surfaces.

In respect to the functionality of the silicon atoms in the amino-organosilicon compounds employed in my invention, particularly good corrosion protection is obtained when amino-organosilicon compounds are employed wherein the amino-organo grouping is connected to a trifunctional silicon atom (i.e., a silicon atom that is also connected to three oxygen atoms). Thus, when the amino-organosilicon is a silane, I prefer to employ amino-organotrihydrocarbonoxysilanes [such as the silanes represented by Formula 1 wherein $a$ is one and $b$ is zero] because of the particularly good corrosion protection obtained thereby. Similarly, when the amino-organosilicon compound is an amino-organosiloxane, I prefer to employ those of the trifunctional variety such as those amino-organosiloxanes that are depicted by Formula 2 because of the particularly good corrosion protection obtained thereby. In these preferred trifunctional amino-organosiloxanes, each silicon atom that has connected thereto at least one amino nitrogen atom through not less than three carbon atoms of a divalent hydrocarbon group is also connected through three oxygen atoms to from 1 to 3 silicon atoms and from 0 to 2 hydrocarbon groups or hydrogen atoms.

Aminoalkylsiloxanes and aminoalkylsilanes, their copolymers and processes for preparing them are also disclosed in U.S. applications Serial Nos. 615,507 now U.S.P. 2,947,771; 615,448, now U.S.P. 2,928,858; 615,449, now U.S.P. 2,929,829 and 615,513, now abandoned, all filed October 12, 1956.

Any amino-organosilicon compound of the types described above whether silanes or siloxanes, cyclics, oils, gums, resins or otherwise need only be soluble in a volatile organic solvent in order to be useful in making my compositions. Mixtures of different amino-organosilicon compounds or mixtures of amino-organosilicon compounds and other organic solvent soluble hydrocarbylsilicon compounds, such as, the hydrocarbonsilanes and hydrocarbonsiloxanes, e.g., dimethyldialkoxysilane, phenyltrialkoxysilane, triethylalkoxysilane, the dimethyl oils, the phenylmethyl oils, the methylsiloxane resins and the like can also be used. An important aspect of this invention is the use of mixtures of amino-organosilanes and hydrocarbylsilanes containing one or more hydrocarbyloxy, preferably alkoxy groups, in the molecule as reactive components in my compositions in addition to the aminoalkylsilicon components.

Most suitable as the starting amino-organosilicon compound are the partial hydrolysis products of aminoalkylalkoxysilanes as well as the partial cohydrolysis products of aminoalkylalkoxysilanes and hydrocarbon alkoxysilanes. Such products are polysiloxanes containing siliconbonded alkoxy groups. The aminoalkylalkoxysilane employed in the preparation of such partial hydrolysis products is preferably trifunctional in nature, that is, it contains 3 alkoxy groups bonded to silicon, although such aminoalkylalkoxysilane can be difunctional, that is, it contains 2 alkoxy groups bonded to silicon. In the case of partial cohydrolysis products, the aminoalkylalkoxysilane can be either di- or trifunctional with respect to alkoxy groups, however it is preferred that one or more of the hydrocarbon alkoxysilanes be trifunctional in nature should the starting aminoalkylalkoxysilane be difunctional. It is preferred that the mixtures of alkoxysilanes that are partially cohydrolyzed contain an average of from 2.4 to 3 alkoxy groups per silicon atom. It is also preferred that such mixtures be cohydrolyzed by the use of limited amounts of water to the extent that polysiloxanes are prepared containing from 0.1 to 2 alkoxy groups per silicon atom of the polysiloxanes prepared by such partial cohydrolysis. When cohydrolysis is carried out with extremely small amounts of water a mixture of alkoxysilanes and alkoxy-containing polysiloxanes are prepared and such mixtures can have an average of up to 2.5 alkoxy groups per silicon atom of the mixture of such alkoxysilanes and alkoxy-containing polysiloxanes.

The above-mentioned hydrocarbonsilicon compounds, including the hydrocarbonsilanes and the hydrocarbonsiloxanes, that are useful in the compositions of this invention are well known to those skilled in the art. These compounds can be represented by the formula:

$$[R'_cSi—X_{4-c}]$$

wherein R', X and c have been previously defined. Preferred amongst these compounds are those containing one or more silicon-bonded alkoxy groups. The preparation of these compounds is also well known to those skilled in the art and reference is herein made to the numerous United States patents and scientific textbooks and journal articles relating to silicon compounds and their preparation.

Thus, in another important embodiment my compositions comprise amino-organosilicon compounds, hydrocarbonsilicon compounds and epoxy compounds. All of these compounds are described herein. These important compositions contain, in addition to the above-listed reactive components, a volatile organic diluent as previously described.

Epoxy compounds which are used in my compositions are organic compounds containing at least one pair of vicinal carbon atoms to which oxirane oxygen is attached

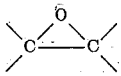

These compounds are for the most part composed of carbon, hydrogen, and oxygen but can also contain such other atoms as nitrogen, sulfur, halogen, phosphorus, silicon, boron and the like. Typical epoxy compounds are represented by the formula:

wherein R° represents alkyl or hydrogen and need not be the same throughout the same molecule; each of the groups M and Y represents hydrogen or a monovalent group composed of a single carbon atom or a group of carbon atoms interconnected by single or multiple bonds and to which such groups as hydrogen, alkyl, hydroxyl, alkoxy, amino, cyclic hydrocarbon groups and the like or combinations thereof can be attached. As groups of carbon atoms, M and Y can contain open chain, e.g., aliphatic, or cyclic, e.g., cycloaliphatic or aromatic and heterocyclic groups or combinations thereof. M and Y can also contain one or more oxirane oxygen atoms attached to vicinal carbon atoms. M or Y or both can represent alkoxyalkyl groups or groups of carbon atoms interconnected by ether linkages,

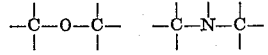

linkages, thio linkages,

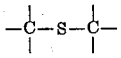

and the like. M and Y, taken together with the vicinal carbon atoms shown can represent a cyclic group such as a cyclohexane ring or a cyclopentane ring, substituted or unsubstituted with other groups, e.g., alkyl, aryl substituents and the like. The presence of other groups not otherwise specifically mentioned herein is by no means harmful and, in fact, are useful in developing special properties in finishes or films formed from my compositions containing such epoxy compounds. For example, M or Y or both contain one or more olefinic double or acetylenic bonds. Thus, the epoxy compound employed in my compositions are selected from the class of monoepoxides and polyepoxides particularly monoepoxides, diepoxides and triepoxides or mixtures thereof. By the term "epoxy," as used herein in designating a group or compound containing oxirane oxygen attached to vicinal carbon atoms,

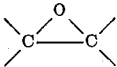

Representative of the epoxy compounds defined above are the aliphatic, cycloaliphatic, aliphatic-substituted aromatic and cycloaliphatic-substituted aromatic monoepoxides and polyepoxides, such as, butadiene dioxide, the epoxyoctanes, the epoxybutanes, the epoxyhexadecanes, the epoxyoctadecanes, gamma-glycidoxypropyltriethoxysilane, 4,5-epoxypentyltriethoxysilane, cyclohexene monoxide, vinylcyclohexene dioxide, cyclopentene monoxide, dicyclopentadiene dioxide, glycidyl propyl ether, glycidyl allyl ether, diglycidyl ether, 1,2-epoxyethylbenzene, glycidyl phenyl ether, gycidyl butyl ether, 1,2,3-tri(1,2-epoxypropoxy) propane (the triglycidyl ether of glycerine), 3,4-epoxycyclohexylmethyl 3,4-epoxycyclohexanecarboxylate, 1,6-hexanediol bis(3,4-epoxycyclohexanecarboxylate), 1,1,1-trimethylolpropane tris(3,4-epoxycyclohexanecarboxylate) bis(3,4-epoxy - 6 - methylcyclohexylmethyl) maleate, bis(2,3-epoxycyclopentyl) ether, allyl 2,3-epoxycyclopentyl ether, divinylbenzene dioxide, epichlorhydrin, and the reaction products of halohydrins and polyhydric phenols, i.e., the polyglycidyl polyethers of polyhydric phenols, as for example, the diglycidyl ethers of 4,4'-dihydroxydiphenyl-2,2 - propane, 44' - dihydroxydiphenylmethane and the like and the higher polymers thereof as represented by the formula:

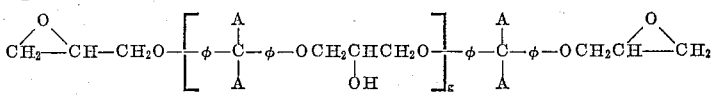

where A is hydrogen or alkyl, φ is phenylene, and g is a number proportional to the average chain length of the polymer. This formula, of course, is ideal and in practice does not in all cases truly represent all the compounds actually obtained by the reaction of epichlorhydrin and polyhydric phenols. Thus mixtures of the diglycidyl polymers of varying molecular weight and some polymers of higher and lower glycidyl content, e.g., the triglycidyl and monoglycidyl polymers, are obtained in said reaction. The term "diglycidyl ether of a polyhydric phenol," e.g., bisphenol A, hence, includes any such mixtures obtained in practice as well as the pure diglycidyl polymer. The polyglycidyl polyethers are best characterized by their epoxy equivalency, i.e., the grams of polyglycidyl polyether which contains one gram-mole of epoxy group, and their melting points or melting point ranges (such as are determined by Durran's Mercury Method) or their viscosities. The polyhydric phenols, 4,4'-dihydroxydiphenyl - 2,2 - propane and 4,4-dihydroxydiphenyl methane are hereinafter referred to as bisphenol A and bisphenol F, respectively.

A large number of epoxy compounds are commercially available. Nevertheless, they also can be made by several methods known in the art. One versatile method involves the epoxidation of organic compounds containing olefinic unsaturation employing as epoxidizing agent any one of a variety of peroxides such as peracetic acid, performic acid, perbenzoic acid, acetaldehyde monoperacetate and the like. For example, vinylcyclohexene is epoxidized by peracetic acid to vinylcyclohexane dioxide. Epoxidations of this kind are amply described in the literature and reference is made to United States Patents 2,716,123; 2,745,847; 2,750,395 and 2,785,185 and to Chemical Reviews, volume 45, Number 1, August 1949, pages 1 through 68. Epoxy compounds can be also prepared by the reaction of halohydrins, e.g., epichlorhydrin, with monohydric or polyhydric compounds, e.g., phenols and polyhydric phenols. Such reactions are carried out in accordance with methods well known in the art and generally involve the reaction of halohydrin and polyhydric compounds in the presence of sufficient caustic alkali, or other strong alkali, to combine with the halogen of the halohydrin. These methods are amply described in the literature, for example, in the United States Patents 2,506,486; 2,582,985; 2,592,560 and 2,615,007.

Volatile organic diluents which are employed in my compositions include any volatile liquid or solid organic compound which is free of groups which substantially react with the amino-organosilicon compounds and epoxy compound at atmospheric temperatures and pressures. These diluents are volatile solids or liquids (e.g., the hydrocarbons, chlorinated hydrocarbons, nitrogenated paraffins, hydrocarbon ethers, hydrocarbon alcohols and hydrocarbon alcohol-ethers) which are solvents for the amino-organosilicon-epoxy mixture or for the adduct. Solid diluents which are solvents for the amino-organosilicon-epoxy mixture or adduct form solid solutions when mixed therewith. Liquid diluents which are solvents are the easiest to use and hence are preferred. These liquid solvents when mixed with the amino-organosilicon-epoxy mixture or adduct provide or form liquid solutions which are simple to prepare and can be readily varied in concentration so as to allow the versatile use of the finishing compositions. A single diluent or mixtures of diluent can be used.

My compositions contain volatile organic solvents in addition to the amino-organosilicon and epoxy compounds and are in the form of solution which are particularly advantageous in that the shelf-lives of such compositions are much greater than similar compositions containing no organic solvent. These relatively storage-stable compositions are further advantageous from the standpoint of convenience and economy since it has been found that even extremely thin films laid down from such compositions provide superior corrosion resistance to metals. These and other advantageous effects make my compositions containing organic solvents extremely useful compositions.

Volatile solvents for use in my compositions include the saturated and unsaturated hydrocarbons, e.g., heptane, cyclohexane, heptene, mineral spirits (i.e., volatile hydrocarbons derived from low boiling petroleum fractions), toluene, xylene, tetrahydronaphthalene, decahydronaphthalene and the like; the halogenated hydrocarbons, e.g., chlorobenzene, chloroform, carbontetrachloride, trichloroethylene, dichloroethylether and the like; the nitrogenated paraffins, e.g., nitropropane, hydrocarbon ether, e.g., isopropyl ether, diphenyl ether, dioxane, and the like; hydrocarbon alcohols and hydrocarbon alcohol-ethers, e.g., ethanol, butanol, ethylene gylcol, diethylene glycol, and the monoalkyl ethers of alkylene glycols such as the monoalkyl ethers of ethylene, diethylene, propylene and dipropylene glycol, monomethyl ether of ethylene glycol (hereinafter referred to also as methyl "Cellosolve"), mixtures thereof, and the like.

In a preferred embodiment of the present invention, the volatile organic diluent will comprise a mixture of solvents. Most suitable are mixtures of volatile organic diluents which contain at least one member selected from the group consisting of hydrocarbon ethers, hydrocarbon alcohols and hydrocarbon alcohol-ethers. Most preferred are volatile organic diluents which comprise mixtures of aromatic hydrocarbons with one or more members selected from the class consisting of aliphatic hydrocarbon ethers, aliphatic hydrocarbon alcohols and hydrocarbon alcohol-ethers. In most instances the total amount of any one or combination of such hydrocarbon ethers, hydrocarbon alcohols or aliphatic hydrocarbon alcohol-ethers present in admixture with an aromatic hydrocarbon to form the diluent mixture will lie in the range from about 1 to 50 percent by weight, and preferably from about 2 to 30 percent by weight, of the over-all diluent mixture.

The most preferred volatile organic diluents described above provide my finishing compositions with improved shelf-like and improved solubility characteristics and, in addition, make possible the ready application of such coating compositions in films with improved resistance to hazing, checking, blushing, peeling, and the like. Moreover, finishing compositions comprising an amino-organosilicon compound, an epoxy compound, and the most preferred volatile organic diluents are most receptive to the presence of additives which can modify or enhance the properties or use of such compositions.

Additives can be incorporated into my compositions for modifying the properties of the compositions themselves or the finishes made therefrom. Such additives include ketones, aldehydes, esters, acids, pigments, or dyes as coloring agents, fillers, waxes (including synthetic waxes), plasticizers and resins (including silicone and organic resins). Typical additives are methyl isobutyl ketone, isophorone, heptaldehyde, amyl acetate, ethyl acetate, "Cellosolve" acetate (i.e., $HOCH_2CH_2OOCCH_3$), natural waxes such as beeswax and carnauba wax, synthetic waxes such as the highly chlorinated aromatics and aliphatics commercially available as the "Halowaxes" and "Arochlors," the high molecular weight polyoxyalkylenes and microcrystalline waxes (high molecular weight refined petroleum residues), the drying, semi-drying and non-drying oils such as linseed oil and coconut oil, the fatty acids such as oleic and linoleic acids, silicone oils or resins such as a phenylmethyl polysiloxanes having R/Si of 2 or less, organic resins such as cellulose acetate butyrate resins and vinyl chloride resins and the like. The additives can be reactive or non-reactive with my compositions. These additives, when added to my compositions in amounts of less than 50 weight percent and preferably not greater than 30 weight percent and in most instances not greater than about 20 percent based on the weight of composition, aid in modifying or enhancing film properties or in effecting economies by adding bulk to the films, if such is desired. Illustratively, the ketones, esters and aldehydes which are cellulose lacquer-type solvents are added to enhance anti-blush and anti-craze properties, act as leveling agents and in general aid the film-forming properties of my composition. Natural and synthetic waxes when added in small amounts enhance the mar resistance and gloss and the anti-wetting properties of films made from compositions containing them. Silicone resins enhance anti-wetting properties and hardness and promote faster drying of films laid down from compositions containing them. Many other additives for developing special properties and enhancing other properties of films are known to those skilled in the art of protective coatings and in accordance with the knowledge of those skilled in the art can be employed for similar purposes in my compositions.

My finishing compositions are made by forming diluent mixtures of the amino-organosilicon compounds and the epoxy compounds. Mixtures thus formed can be applied as such to the article being finished or, particularly when an amino-organosilane is employed, such mixtures can be thermally induced to partially react thus forming a curable adduct of the silicon compound and epoxy compounds. This procedure of partially reacting is herein called "ripening" and, in addition to providing the advantageous effects hereinafter set forth, is also employed when gaseous epoxides are used. The partially reacted or ripened mixture, which is curable, then can be applied to the article being finished. The amino-organosilane-epoxy mixtures as a class have been found to possess longer shelf-lives than amino-organosiloxane-epoxy mixtures as a class. For this reason the amino-organosilane-epoxy mixtures can be advantageously pre-reacted prior to application to promote more rapid air drying once applied and to provide higher viscosities as desired. The amino-organosiloxane-epoxy mixtures on the other hand are very rapid drying and need not be pre-reacted to provide a higher viscosity.

My superior finishing compositions are made by mixing the amino-organosilicon compound, epoxy compound and the organic diluent. Such compositions, which are in the form of a solution, can be prepared by adding the amino-organosilicon compound and the epoxy compound to the organic diluent or by mixing the epoxy compound with organic diluent, mixing the amino-organosilicon compound with organic diluent and then mixing the two mixtures thus formed, or by any other sequence. Mixtures thus formed are particularly advantageous in that the shelf-lives thereof are markedly improved and applied film thicknesses can be adjusted as desired. The remarkably superior properties of these compositions can be further improved by ripening or thermally inducing the silicon compound and epoxy compound to pre-react and partially cure thus producing a curable partial reaction product (curable adduct) that is soluble in the organic diluent. I have found that when my finishing compositions are ripened the corrosion resistance of finishes made therefrom are even further improved over unripened finishing compositions. Thus, for best corrosion resistance my finishing compositions are suitably ripened prior to application.

The process for preparing my novel finishing compositions which are in the form of solutions and which comprise a mixture of a curable adduct of an amino-organosilicon compound and an epoxy compound with a volatile organic diluent comprises the steps of forming a mixture of an amino-organosilicon compound, an epoxy compound and a volatile organic diluent in which the amino-organosilicon compound and the epoxy compound are soluble to form a solution and subjecting the mixture so formed to a temperature in the range of from about room temperature to about the reflux temperature of the mixture for sufficient time to cause the amino-organosilicon compound and the epoxy compound to partially react to form a curable adduct and provide a solution comprising the curable adduct and the volatile organic diluent. In carrying out the process for preparing such compositions, the volatile organic diluent is present in the starting mixture in an amount of at least 25 percent and preferably in an amount of at least 50 percent by weight of such mixture. When the starting amino-organosilicon compound is an amino-organosiloxane, it is preferred that the volatile organic diluent be present in the starting mixture in an amount of at least 75 percent by weight of such starting mixture. Stated in other terms, the amino-organosilicon compound and the epoxy compound are present in the starting mixture in amounts up to about 75 percent, and preferably in amounts up to about 50 percent, by weight of such starting mixture. However, when the starting amino-organosilicon compound is an amino-organosiloxane, it is preferred that the epoxy compound and such amino-organosilicon compound be present in the starting mixture in amounts up to about 25 percent by weight thereof.

The maximum amount of volatile organic diluent, or the minimum amount of the amino-organosilicon compound and epoxy compound, present in the starting mixture employed to prepare the ripened compositions of the present invention will be governed by practical considerations. Thus, for example, it will be economically feasible to carry out the ripening reaction with minimum prescribed amounts of volatile organic diluent and hence the maximum solids content (amount of amino-organosilicon compound and epoxy compound) permissible in accordance with the teachings of my invention, and subsequently add to the solution of the curable adducts prepared thereby sufficient volatile organic diluent to provide the preferred compositions. On the other hand, the ripening reaction can be carried out with as small a quantity of the amino-organosilicon compound and epoxy compound and as large a quantity of the volatile organic diluent as desired. Thus, for example, the ripening reaction can be carried out with as little as 0.1 percent or less by weight of the starting reaction mixture of the amino-organosilicon compound and the epoxy compound and as much as 99.9 percent by weight of the starting reaction mixture of the volatile organic diluent.

Ripening is believed to involve a coupling reaction of the amino group of the amino-organosilicon compound and the epoxy group of the epoxy compound. This coupling reaction occurs at a finite rate and is affected by temperature, relative concentrations of reactants, solvents or diluents, the presence of catalysts, steric factors and other variables. Illustrative of the effect of ripening in improving corrosion resistant properties are the results of tests performed by applying finishes to metal panels at specified time intervals ranging from 15 minutes to 2 to 7 days after their preparation. The finish applied 15 minutes after preparation showed resistance to corrosive conditions whereas finishes applied 2 to 7 days after their preparation showed a much improved corrosion resistance.

Several advantageous methods are employed in ripening my compositions. In accordance with these methods the amino-organosilicon-epoxy composition is (1) stored at atmospheric temperatures; (2) stored at elevated temperatures; (3) refluxed in solvent; or (4) heated in solvent to fractionate out any by-products of any condensation reaction of the amino and epoxy groups. Ripening is accelerated at elevated temperatures. Thus, storing, refluxing or heating at high temperatures decreases the ripening time. Ripening occurs more quickly when amino-alkylsiloxanes are employed in my compositions than when amino-alkylsilanes are employed. As illustrative of the ripening process in producing my compositions, a gamma-aminopropylphenylsilicone copolymer,

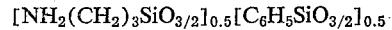

(having an aminohydrogen equivalent weight of about 120) and a diglycidyl ether of bisphenol A (having an epoxy equivalency of about 192) were mixed in such proportions as to provide two amino hydrogen equivalents of the silicone for each epoxy equivalent of the epoxide. The mixture was diluted to 7.5 percent solids by adding a solvent comprising 60 parts toluene and 40 parts $CH_3OCH_2CH_2OH$ (methyl "Cellosolve") and allowed to ripen by storing at room temperature for 3 to 5 days. (Alternatively, the mixture is refluxed for 4 to 16 hours.) At the end of this time the mixture was found to be suitably ripened for providing superior finish. As a further illustration of the ripening process, 221 grams (1 mole) of gamma-aminopropyltriethoxysilane, 239 grams (1 mole) of phenyltriethoxysilane and 192 grams (1 epoxy equivalent weight) of diglycidyl ether of bisphenol A (having an epoxy equivalency of about 192) were admixed. Three portions of the mixture were ripened by the following three methods: (a) stored at 70° C. for three weeks during which period the viscosity increases from that of a thin liquid to about 25,000 centipoises; (b) an equal weight of toluene was added and the solution refluxed for 6 to 24 hours; (c) an equal weight of toluene was added and the solution heated to evolve ethanol. Each of the compositions thus obtained were diluted with solvent and were found to be satisfactorily ripened for providing a superior finish on metal surfaces.

The relative proportions of amino-organosilicon compound and epoxy compound contained in my compositions are not narrowly critical and can be varied over a wide range. I have employed compositions of the type described herein which contain amounts of epoxy compound providing from 0.05 to 5.0 epoxy equivalents for each amino hydrogen equivalent provided by the amino-organosilicon compound contained by the composition. Compositions containing such amounts of the reactive components provided corrosion resistance to metals finished therewith. By the term "epoxy equivalents," as used herein, is meant the number of moles of epoxy groups,

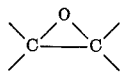

contained by a given amount of epoxy compound. Thus, one mole of monoepoxide contains one epoxy equivalent, one mole of a diepoxide contains two epoxy equivalents, and so forth. The term "epoxy equivalency," as used herein, means the number of grams of an epoxy compound which contains one gram-mole of epoxy group and is the reciprocal of the epoxy equivalents. The term "amino hydrogen equivalents," as used herein, means the number of moles of amino hydrogen atoms, H—, attached to nitrogen, contained by a given amount of amino-organosilicon compound. Thus, one mole of gamma-aminopropyltriethoxysilane contains two amino hydrogen equivalents, one mole of gamma-aminopropylphenyl cyclic tetramer contains eight amino hydrogen equivalents and so forth. I have found that very good air drying finish compositions contain 0.05 epoxy equivalents of epoxy compound per 1.0 amino equivalent of amino-organosilicon compound. Also, compositions comprising amounts of epoxy compound containing 0.05 to 2.5 epoxy equivalents and amounts of amino-organosilicon compound containing one amino hydrogen equivalent have been found to air dry and are capable of providing excellent corrosion resistance to metals when applied and cured thereon. The best compositions, however, are those comprising amounts of epoxy and amino-organosilicon compounds which provide 0.005 to 1.5 epoxy equivalents for each amino hydrogen equivalent. The amount of hydrocarbonsilicon compound, in particular hydrocarbonsilane, when used in my compositions, also is not narrowly critical and can be varied over a wide range. Thus, a molar ratio of 1 mole of a hydrocarbonsilane (e.g., phenyltriethoxysilane) or of a mixture of hydrocarbonsilane, per mole of amino-organosilane (e.g., gamma-aminopropyltriethoxysilane) or mixtures of amino-organosilanes, provide excellent finishing compositions and molar ratios above and below the equimolar ratio are also advantageously used.

The ripened and the finally cured products are higher in molecular weight than any of the reactants contained by the composition from which they are formed. Thus, one function of the epoxy compound is in effect, to crosslink the amino-organosilicon compounds thereby increasing the molecular weight. Indeed, it is remarkable that certain amino-organosilicones which themselves are highly cross-linked can be further cross-linked by epoxy compounds to give, quite unexpectedly, solvent-soluble ripened products. Upon application, as for example, to metals, films are formed from solutions of these ripened products as the solvent volatilizes and a final curing of the film on the metal occurs giving a solvent insoluble finish. Thus, in accordance with my invention, highly cross-linked amino-organosilicone-epoxy adducts are prepared so as to retain solubility and utility during storage and application and which become more highly cross-linked and insoluble upon air curing at atmospheric temperatures.

The functionality of the epoxy compound, the degree of polymerization of the amino-organosilicon compound and the relative proportions of these compounds in my compositions have important effects on the shelf-lives of my compositions. I have found, for example, that dilutions which contain a ripened aminoalkylsilane or -siloxane-monoepoxide mixture can be stored for long periods of time (i.e., indefinitely) without showing any signs of gelation or precipitation and without regard to concentration. Similarly, dilutions of ripened amino-alkylsilane-diepoxide mixtures have been found to be stable to gelation or precipitation for long periods of time at very high solids content (for example, 50 to 75 percent and even higher). In fact the addition of further amounts of monoepoxide does not adversely affect the shelf-life and can even enhance aqueous corrosion resistance properties by diminishing or eliminating any water-transmitting nitrogen to hydrogen bonds which may be present. When the composition contains ripened amino-organosiloxane diepoxide mixtures, however, I have found that lower epoxy equivalent to amino hydrogen equivalent ratios and higher dilution extend the shelf-lives of said compositions. For example, in one instance where two amino hydrogen equivalents of an aminoalkylsiloxane were ripened with one epoxy equivalent of a diepoxide and diluted to a 10 percent solids or higher compositions, the shelf-life was less than one week. When the same ripened composition was diluted to a less than 10 percent solids composition, it showed no signs of gelation or precipitation for 1 to 3 months. However, if the relative proportions of diepoxide to siloxane were decreased to about 0.2 to 0.25 epoxy equivalent of diepoxide for each amino hydrogen equivalent of aminoalkylsiloxane and the ripened mixture diluted to 10 percent solids or even higher, the shelf-life was extended to long periods covering at least several months. These compositions (i.e., 0.2 to 0.25 epoxy equivalent per amino hydrogen equivalent) could even be further reacted with monoepoxides so as to react all amino hydrogens without any adverse affect on shelf-life to provide even additional water and solvent resistance.

Another important feature of this invention is its versatility in providing many different types of compositions which are useful for varied purposes under widely varied conditions. As pointed out above compositions having shelf-lives of indefinite duration can be made as well as compositions of limited shelf-life. The teachings of this invention have also made it possible to produce compositions which once applied and cured form finishes which are readily removable by selected methods, or to produce compositions which when applied and cured as finishes are extremely resistant to removal except by drastic methods. Of course, compositions forming finishes with varying degrees of removability are made by my invention. It is thus quite unexpected that all of my compositions form finishes that outstandingly resist corrosion and still can be made as readily removable or substantially unremovable as desired. I have found, for example, that compositions comprising as the epoxy portion a higher proportion of monoepoxide than polyepoxide, or all monoepoxide, form coatings which can be readily removed but which also impart a high degree of resistance to corrosion and such action as by solvents, detergents and the like. On the other hand, compositions containing more polyepoxide than monoepoxide or all polyepoxide, as the epoxy portion require more drastic methods of removal but provide superior resistance to corrosion and solvent action.

Not wishing to be bound by any particular theory or reaction mechanism, the following explanation is believed to define the reactions taking place during ripening and/or final curing.

The fundamental reaction occurring during ripening and final curing takes place between the amino-organosilicon compound and the epoxy compound and involves the addition of the amino group to the epoxy group to form a nitrogen to carbon bond linking the amino-organosilicon compound molecule to the epoxy compound molecule and also a hydroxyl group attached to said epoxy compound molecule. Using the reaction between a gamma-aminopropylsilicon compound and styrene oxide as exemplary, the fundamental reaction is illustrated by:

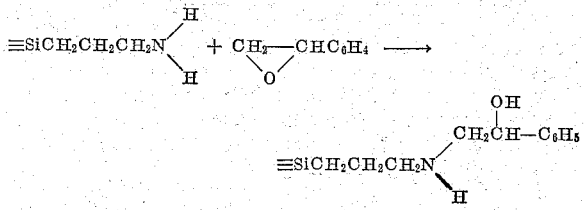

where the amounts of reactants correspond to one epoxy equivalent for two amino hydrogen equivalent. When amounts containing one epoxy equivalent for each amino hydrogen equivalent are used the reaction proceeds further, as follows:

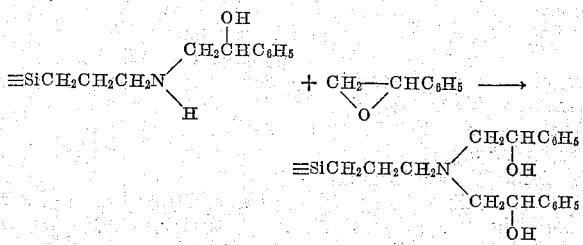

Although the foregoing equations show reactions employing stoichiometric amounts of the reactants, I have found, as hereinabove stated, that other than stoichiometric amounts of reactants can be used to provide corrosion resistant coatings. Thus, my ripened or finally cured compositions are believed to contain some unreacted amino hydrogen atoms when an amount of aminosilicon compound over and above the stoichiometric amount required to completely react with all of the epoxy groups contained by the composition is used. Similarly, unreacted epoxy groups are believed to be present in my ripened or finally cured compositions when greater than stoichiometric amounts of epoxy compound are used.

Still not wishing to be held to any theory or mechanics of reaction, I believe that an ester exchange type of reaction takes place with the alkoxy groups and hydroxyl groups in a ripened composition made from an amino-organo-alkoxy silane or siloxane and an epoxy compound. The alkoxy groups are, of course, attached to the silane originally introduced and the hydroxyl groups are formed by the reaction of epoxy with amino hydrogen as previously described. Using the styrene oxide-(gamma-aminopropyl) silane adduct as illustrative, this ester exchange reaction can be represented as:

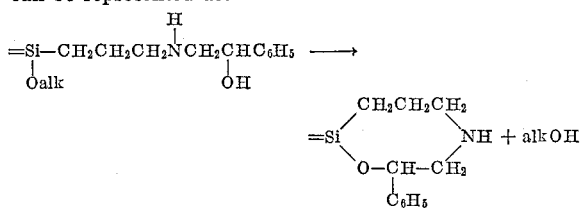

where alk denotes an alkyl group. This reaction of course can also take place intermolecularly between two different molecules to form cross-linkages, as well as intramolecularly as shown. The ester exchange reactions are believed to have outward manifestations on the properties of ripened compositions. For example, the polarity of the alkoxysilane-epoxy adduct is believed to be diminished and the solubility of the ripened composition in hydrocarbon solvents improved if the ester exchange is allowed to occur. It is readily apparent that, due to the presence of the many reactive sites originally present in my composition or formed by ripening, my compositions can simultaneously and/or successively undergo other reactions to form linkages and cross-linkages in and amongst the reactive molecules contained by the compositions during ripening or final curing.

My novel articles of manufacture are comprised of a base member having thereon a finally cured finish or film of a resinous material comprising the reaction product of one or more amino-organosilicon compounds and one or more epoxy compounds. The articles or surfaces embodying the base member which are advantageously finished with and protected from corrosion by my compositions in accordance with this invention are the metals lying between magnesium and silver in the electromotive series and including both magnesium and silver and the various combinations thereof as alloys or in discrete layers such as are found in chromium plated steel. Such metals include aluminum, brass, bronze, copper, chromium, iron, magnesium, nickel, lead, steel, silver, silver-plate, sterling silver, ternplate (i.e., tin plate), tin beryllium, bronze and zinc. Excellent corrosion protection was provided by my finishes for all metals.

By the present invention, the corrosion resistance of such metals is improved by applying a continuous film of my amino-organosilicon-epoxy composition on the surface of the metal and curing the film to form a bonded finish on the surface of the metal. The method by which my amino-organosilicon-epoxy composition is applied to the metal is not critical and any method can be employed that results in the deposition of a uniform, continuous film. The compositions can be applied by flooding, immersion and the like. Films have also been made by spray application from aerosol bombs and from spray guns. In the use of aerosol bombs, the usual chloroperfluorohydrocarbons, such as, monochloroperfluoromethane, dichloroperfluoromethane, monochloroperfluoroethane, mixtures thereof and the like, and the volatile hydrocarbon gases, such as propane, the butanes, the pentanes, butene, amylenes, mixtures thereof and the like are used as propellants for the amino-silicon-epoxy compositions. The propellant and the amino-organosilicon-epoxy composition, as a solution, emulsion or in undiluted form, are enclosed in a suitable aerosol container or bomb.

As can be noted from the above, compositions prepared in accordance with the teachings of the present invention are storable compositions in the form of solutions that are characterized by a relatively high degree of stability to gelation and precipitation. Furthermore these relatively storage stable compositions are used for finishing articles and can contain varying concentrations of amino-organosilicon-epoxy mixtures or adducts depending on the mode of application and desired thickness of film or finish. The amount of mixture or adduct in a particular composition or system is not critical and can be varied over wide ranges. I have used, with good results, compositions containing up to 50 percent by weight of mixture of adduct based on the weight of composition. Obviously compositions containing lesser amounts of the amino-organosilicon-epoxy mixtures or adducts can be employed. As hereinabove set forth it will be economically feasible to prepare such compositions at the highest concentrations permissible in accordance with the teachings of my invention and dilute the compositions so prepared as required. As shown in the illustrative examples appearing below, excellent results have been obtained with compositions containing from 5 percent to 20 percent by weight of the amino-organosilicon-epoxy mixture or adduct when such compositions were applied by a dip and flood applying technique. As is apparent, compositions containing lesser and greater amounts of the mixtures or adducts can be employed depending on such variables as the thickness of protective film desired, the economics of the application and the method of application. Thus, for example, spray techniques permit a more efficient use of the compositions of my invention and hence compositions of a more dilute nature can be employed as compared to those compositions used in dip or flood coating techniques. On the other hand, it may be more desirable to insure thorough application of the composition to a metal surface to employ multiple application techniques and hence use compositions containing lesser amounts of the amino-organosilicon-epoxy mixture or adduct in each application than would be ordinarily employed if a single application method were employed. However, practical considerations dictate that the compositions contain at least 0.1 percent by weight of the mixture or adduct. In most instances it will be desirable to employ compositions containing from about 1 percent to about 10 percent by weight of the amino-organosilicon-epoxy compound or adduct. Should time and other practical considerations not be important, several applications of compositions containing less than 0.1 percent by weight of the amino-organosilicon-epoxy mixture or adduct can be employed. Compositions containing greater amounts of amino-organosilicon-epoxy mixture or adduct can be used. The concentration also largely depends upon cost and convenience in addition to the shelf-life desired.

The most desirable finishing compositions of my invention are in the form of a solution and contain the amino-organosilicon-epoxy mixtures or adducts in amounts up to about 25 percent by weight. Best over-all results with respect to solubility characteristics and to resistance to gelation and/or precipitation on storage at room or elevated temperatures and with respect to the process of improving corrosion resistance of metal surfaces as well as in the performance and appearance of articles of improved corrosion resistance are obtained with compositions containing the amino-organosilicon-epoxy mixture or adduct in an amount of from about 1 to about 10 percent and preferably from about 2 to 7.5 percent by weight of the composition.

As one measure of the relatively high degree of resistance to gelation and precipitation which can characterize the relatively stable compositions prepared in accordance with the teachings of the present invention, reference is made to the characteristics of mixtures of an organic amine, an epoxy compound and a volatile organic diluent. By way of illustration, mixtures in the form of solutions comprising one amino equivalent of diethylene triamine and one epoxy equivalent of a diglycidyl ether of 4,4'-dihydroxydiphenyl-2,2-propane and a diluent consisting of 90 parts toluene, 5 parts monobutyl ether of ethylene glycol ($C_4H_9OCH_2CH_2OH$) and 5 parts butanol and in which the total concentration of the organic amine and epoxy compound amounts to 10, 7.5 and 5 percent by weight, were found to exhibit gelation or precipitation in periods up to three days when stored at room temperature (i.e., 25° C.). Such mixtures exhibited gelation or precipitation in less than one day when stored at 50° C. and exhibited gelation or precipitation in less than 16½ hours when stored at 70° C. On the other hand, as set forth hereinabove and as shown in the illustrative examples, such storage at room temperature or heating at temperatures of 70° C. and higher does not cause gelation or precipitation of compositions of the same or higher concentrations and containing one amino hydrogen atom equivalent and one epoxy equivalent prepared in accordance with the teaching of my invention. Instead, such storage or heating of amino-organosilicon-epoxy-diluent mixtures provides solutions of partial reaction products or adducts which are characterized by an improved degree of stability and which, in addition, provide an improvement in the good corrosion resistance properties of metal surfaces obtainable with the use of mixtures.

After applying the amino-organosilicon-epoxy composition to the article or surface, the finish or film is finally cured by simply allowing the coated article to stand at atmospheric temperatures. However, if the superior corrosion resistant properties are to be developed within a short period of time, forced drying at elevated temperatures, for example, about 50° C. is used and this usually requires only about 10 to 20 minutes. In any event, the final curing, whether conducted at atmospheric or elevated temperatures, is thermally induced, that is to say heat (no matter whether positively applied at atmospheric temperatures) is believed to flow into the composition to induce curing. Any diluent present volatilizes during the final curing step. Fixing or bonding of the composition to the article coated therewith occurs during final curing. Certain finishes, if desired, can be finally cured to the insoluble stage, i.e., the stage where the solvent from which the finish was applied or could have been applied no longer dissolves the cured coating. In other instances, a finish or film which is removable at will may be desired. In these instances certain other finishing compositions are used and do not cure to the insoluble stage but can be stripped with suitable solvents from the article when desired.

The thickness of the film applied is not narrowly critical and can vary from very small thicknesses to relatively large ones. Film thicknesses of 0.02 mil to 0.2 mil are within the thickness range which provide optimum corrosion resistance and are preferred. Smaller film thicknesses, e.g., as small as about 0.005 mil, can be applied without materially sacrificing the outstanding corrosion resistant properties. Large film thicknesses, e.g., as large as 1 mil, also provide good corrosion protection but may impart a yellowish appearance to the finished article which may not be particularly desirable in certain applications. Films of several mils also can be applied if desired. The thickness of the film is regulated by the mode of application, as by spraying, dipping, brushing, or troweling; the concentration of amino-organosilicon-epoxy mixtures or adduct in the composition applied; and the number of successive applications made. Even relatively thick films can be obtained by multiple applications with very dilute compositions or extremely thin films can be obtained by a single application of such very dilute compositions. The ability of extremely thin films to provide outstanding corrosion protection to metals is an important aspect and represents a distinct advance in the art of protecting metals by applying films thereto.

The following examples are presented. In these examples, unless otherwise specified, all percentages and parts are based on weight, the symbol $\phi$ designates the phenyl group, refluxing wherever performed was at atmospheric pressure, and all curing, testing, mixing and other steps wherein no temperatures are specified were conducted at room temperature. The procedures described below were employed in the various tests given in the examples:

(a) *Aerated 3 percent salt bath.*—Tests were run by cycling specimen panels supported in such a manner that they hung suspended in a 3 percent sodium chloride water solution at 25° C. Air was continuously bubbled into the salt bath. At the end of a specified period (if none specified, then 16 hours) the panels were removed, hung in a vertical position and allowed to dry. Since the residual salt water was neither blotted nor washed off the panels, salt crystals developed on the panels on drying. After a specified period (if none specified, then 8 hours) of drying the panels were recycled for another specified period or 16 hours in the salt water. The percent corrosion or rusting was recorded upon removal from the salt solution and drying.

(b) *100 percent relative humidity chamber.*—Tests were run by suspending specimen panels in a 100 percent relative humidity chamber maintained under condensing conditions. In this manner a film of condensate formed over the entire panel. The relative humidity chamber was so instrumented that it could operate at either 30° C. or 50° C. Panels were periodically removed from the chamber and the percent corrosion or rusting was recorded.

(c) *20 percent salt fog spray chamber.*—Test specimens were suspended in a salt fog chamber that was maintained at 95° F.±5° F. Air at 14 p.s.i. gauge was saturated by bubbling through water maintained at 115° F. The air was then mixed with a 20 percent salt solution through a fog nozzle and introduced into the chamber. The salt fog completely saturated the chamber. Periodically the metal specimens were removed from the salt spray chamber which was maintained under condensing conditions and the degree of rusting or corrosion was visually observed and recorded.

(d) *The sulfide test.*—Specimens were immersed in a freshly prepared 0.1 percent sodium sulfide solution at 25° C. The solution was prepared by dissolving 0.3 gram of $Na_2S \cdot 9H_2O$ for each 100 grams of water. Imperfections or defects if any in protective films on copper and silver objects could be almost immediately indicated by a darkening of the metal object. The protective films were of excellent quality if they withstood only 16 to 24 hours' immersion in the sulfide solution with no evidence of film breakdown.

(e) *Percent corrosion.*—The measurement "percent corrosion" as used in the examples is obtained visually. A visual observation is made of a metal surface removed from a corrosive environment to determine the degree of corrosion (rusting in the instance where steel is the metal). The percent corrosion is that portion of the panel area exposed to the corrosive medium that has become corroded multiplied by 100 and divided by the total exposed area.

For brevity, the molecular compositions of amino-organosilicon compounds, particularly the siloxanes have been designated herein by the formulas, e.g.,

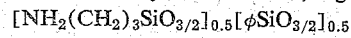

The designations, of course, are approximate as to mole fractions of the various siloxane units and also do not show other minor amounts of different siloxane units which inevitably are present due to impurities in the starting materials from which the siloxanes are made.

These formula designations also fail to show residual silanic-bonded hydroxy and alkoxy groups which also are inevitably present in varying amounts in most siloxanes. Thus, although the formulas appear to be exacting in designating molecular compositions, it is to be understood that they are only approximations and that the siloxanes designated thereby can and inevitably do contain minor amounts of other siloxane units and some hydroxy and/or alkoxy groups.

EXAMPLE 1

A finishing composition was prepared as follows:
In a 2-liter, 3-neck round bottomed flask equipped with an agitator and reflux condenser the following were charged.

153 grams of 47 weight percent gama-aminopropylphenylsilicone copolymer* in mono-methyl ether of ethylene glycol
755 grams of toluene
755 grams of mono-methyl ether of ethylene glycol
57.6 grams of diglycidyl ether of bisphenol A having epoxy equivalency of 192

With agitation, the resulting mixture was heated and maintained at reflux for 6 hours. The product consisted of a 7.5 percent solids of aminoalkylsilicone-epoxy adduct in the solvent solution.

EXAMPLE 2

A finishing composition was prepared as follows:
In an 8-oz. glass jar, there was added 44 grams of $NH_2(CH_2)_3Si(OEt)_3$, 48 grams of $C_6H_5Si(OEt)_3$, and 38.4 grams of the diglycidyl ether of bisphenol A (having an epoxy equivalent wt. of 192). The contents were shaken until well mixed, then placed in the 70° C. oven for four days' storage. During this time, the reaction occurred as evidenced by a gradual increase in viscosity from about 9 cps. at 25° C. to greater than 50,000 cps. Three portions of this concentrate were then diluted to 20 percent solids with the following solvents to give finishing solutions: toluene, 50–50 toluene and mono-methyl ether of ethylene glycol and "Solvesso 150," a commercially available aromatic-aliphatic solvent having the following properties: Color <1 Gardner; specific gravity at 28.8° C. of 0.892 g./cc.; ASTM (dist'n:1 B.P. 193.7° C., 95 percent 193.7–224.0° C., D.P. 227° C.

EXAMPLE 3

A finishing composition was prepared as follows:
To a 3-liter round bottom flask equipped with a 5-plate, glass helix packed fractionating column, there was charged 360 grams of $\phi Si(OEt)_3$, 331.5 grams of $$NH_2(CH_2)_3Si(OEt)_3$$

and 288 grams of the diglycidyl ether of bisphenol A (having an epoxy equivalent weight of 192 and 979 grams of toluene. The kettle contents were heated to reflux and during a 7-hr. reaction period, 789 grams of an ethanol-toluene constant boiling mixture and toluene was removed at the still head under reflux. Make-up toluene in the amount of 775 grams was replenished to the reactor flask. At this point, the product was further diluted with toluene to give a 12.3 percent resin solids solution (determined by heating 1 gram in an aluminum dish 30 min. at 150° C.). The product had the following properties: 9 cps., 1.9 percent silicon; and 6.9 percent ethoxy.

EXAMPLE 4

*Resistance to corrosion at 100 percent relative humidity at 30–33° C.*

A total of five 1½ in. x 6 in. steel panels were cleaned.

---

*The preparation of gamma-aminopropylphenylsilicone copolymer was performed by the cohydrolysis of equal molar quantities of $NH_2(CH_2)_3Si(OEt)_3$ and $C_6H_5Si(OEt)_3$ using only the theoretical amount of water for hydrolysis. The mixture was refluxed about 2–3 hours to insure good equilibration.

One panel (Panel No. 1) was untreated and served as the blank for comparative purposes. Panel No. 2 was coated with approximately 0.03–0.05 mil of gamma-amino-propylphenylsilicone $$(NH_2CH_2CH_2CH_2SiO_{3/2})_{0.5}—(\phi SiO_{3/2})_{0.5}$$

by dip-coating in a 5-weight percent solution in alcohol and the resin coating was then set by heating 15 minutes at 150° C. Panel No. 3 was treated by dipping in a 5 weight percent mono-oleate salt of Duomeen T [1] and was air cured for 3 days. Panel No. 4 was dipped in a 5 weight percent amine hardened epoxy resin and a 1:1 toluene-mono-methyl ether of ethylene glycol solution. The solids were prepared by mixing 80 weight parts of the diglycidyl ether of bisphenol A (having an epoxy equivalent weight of about 192) with 20 weight parts of bis(beta-cyanoethyl)diethylene triamine. This panel was air cured 1 week. Panel No. 5 was immersed in a 5 weight percent resin solids solution prepared by refluxing for 14 hours two amino hydrogen equivalents of gamma-aminopropylphenylsilicone with one epoxy equivalent of the diglycidyl ether of bisphenol A (having an epoxy equivalent weight of about 192) in 50–50 mixture of toluene and the monomethyl ether of ethylene glycol as a solvent. This panel was air dried for 16 hours.

After curing or drying, all five panels were placed in a 100 percent relative humidity cabinet maintained at 30–33° C.

The rate of corrosion by rusting was periodically checked during a 4-day period. The following table lists the amount of corroded surface on the steel panel at the end of the test.

| Panel No. | Panel Treatment | Percent Corrosion |
| --- | --- | --- |
| 1 | Control of Blank | 100. |
| 3 | Duomeen T Monooleate | 100. |
| 4 | Amine-hardened epoxy | Approx. 85. |
| 2 | Gamma-aminopropylphenylsilocone | Approx. 25. |
| 5 | Aminoalkylsilicone-epoxy compound | Less than 5. |

This example shows that heretofore known amine compounds, amine-hardened epoxy compounds and aminoalkylsilicone compounds are not as effective as corrosion preventatives for metals by comparison with the aminoalkylsilicone-epoxy adducts of this invention under the same test conditions.

EXAMPLE 5

To show that other aminoalkylsilicon compound mixed in different equivalent ratios with epoxy compounds were also effective as corrosion inhibitors for metals, the following were prepared:

| Amino Hydrogen Equivalents of The Aminoalkylsilicone Compounds | Epoxy Equivalent of Diglycidyl Ether of Bis Phenol A (having an epoxy equivalent wt. of about 192) |
| --- | --- |
| 1.0 gamma-aminopropylphenylsilicone [1] | 1.0 |
| 2.0 gamma-aminopropylphenylsilicone [1] | 1.0 |
| 4.0 gamma-aminopropylphenylsilicone [1] | 1.0 |
| 6.0 gamma-aminopropylphenylsilicone [1] | 1.0 |
| 1.0 gamma-aminopropylvinylsilicone [2] | 1.0 |
| 2.0 gamma-aminopropylvinylsilicone [2] | 1.0 |
| 4.0 gamma-aminopropylvinylsilicone [2] | 1.0 |
| 6.0 gamma-aminopropylvinylsilicone [2] | 1.0 |
| 1.0 gamma-aminopropylamylsilicone [3] | 1.0 |
| 2.0 gamma-aminopropylamylsilicone [3] | 1.0 |
| 4.0 gamma-aminopropylamylsilicone [3] | 1.0 |
| 6.0 gamma-aminopropylamylsilicone [3] | 1.0 |

[1] $(NH_2CH_2CH_2CH_2SiO_{3/2})_{0.5}$ $(\phi SiO_{3/2})_{0.5}$.
[2] $(NH_2CH_2CH_2CH_2SiO_{3/2})_{0.5}$ $(CH_2=CHSiO_{3/2})_{0.5}$.
[3] $(NH_2CH_2CH_2CH_2SiO_{3/2})_{0.5}$ $(C_5H_{11}SiO_{3/2})_{0.5}$.

---

[1] Duomeen T monooleate and dioleate salts are commercially available anti-corrosion agents. Duomeen T has the following formula: $RNHCH_2CH_2CH_2NH_2$ where R is an alkyl group derived from the fatty acids in tallow. R has carbon chains predominantly 16 and 18 carbon atoms long. The oleate salt is the equivalently neutralized soap of Duomeen T.

These compositions were prepared by adding a 25-30 weight percent solution of the above-mentioned aminoalkylsilicones in ethanol with the above-described epoxy equivalents of epoxy compound and diluting to 5 weight percent resin solids in a 50-50 mixture of toluene and the monomethyl ether of ethylene glycol as a solvent. The solutions were allowed to ripen for 3-5 days at room temperature (about 25° C.) after which they were flood coated on clean steel strip, 1½ in. x 6 in., and allowed to drain dry. The panels were air dried for 16 hours before exposure to the corrosive environment. In addition, cleaned but otherwise steel strips were run as controls. In this manner, the ability of 0.03-0.05 mil thickness of aminoalkylsilicone-epoxy finish to prevent or inhibit corrosion was observed. The following corrosive environments were successively used in testing the strips:

(1) Exposure 4 days on roof to industrial atmosphere,
(2) Exposure 4 days in 100 percent relative humidity cabinet at 30-33° C.,
(3) Immersion for 13 hours in areated water,
(4) Immersion for about 5.5 hours in 5 percent salt water, and
(5) Exposure to 5 percent salt fog at 30° C. for 24 hours.

At the end of the test the untreated metal strips showed considerable corrosion. The aminoalkylsilicone-epoxy finished strips were either completely free of all evidences of corrosion or were just beginning to show evidences of corrosion. These tests clearly show that a variety of amino-alkylsilicones can be reacted with epoxy compounds in widely varying amounts to give resin solutions which when applied to metal surfaces prevent corrosion.

EXAMPLE 6

Stainless steel panels were finished with a 5 weight-percent resin solids prepared by mixing two amino hydrogen equivalents of gamma-aminopropylphenylsilicone [2] 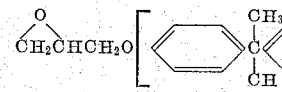 with one epoxy equivalent of diglycidyl ether of bis phenol A (having an epoxy equivalent weight of about 192) in a solvent mixture containing 50 wt.-percent of toluene and 50 wt.-percent of the monomethyl ether of ethylene glycol. The panels were allowed to drain dry, then air cured for 16 hours. The panels were then placed in an industrial atmosphere for 2 weeks.

Stainless steel panels of the same type which were untreated (unfinished) were concurrently placed in this atmosphere and served as controls. At the end of this test period the untreated stainless steel panels were stained and had corroded. The panels finished with the aminoalkylsilicone-epoxy adduct were untarnished.

EXAMPLE 7

Hot rolled steel (black plate) was cleaned, dried, and finished with the following 5 weight-percent aminoalkylsilicone-epoxy adducts in a solvent mixture containing 50 wt.-percent of toluene and 50 wt.-percent of the monomethyl ether of ethylene glycol which had aged for 3 days prior to use.

| Amino Hydrogen Equivalent of the Aminoalkylsilicone Compounds | Epoxy Equivalents of Diglycidyl Ether of Bis Phenol A (having an epoxy equivalent weight of about 192) |
|---|---|
| 2.0 gamma-aminopropylphenylsilicone [1] | 1.0 |
| 1.0 gamma-aminopropylvinylsilicone [2] | 1.0 |
| 2.0 gamma-aminopropylvinylsilicone [2] | 1.0 |
| 4.0 gamma-aminopropylvinylsilicone [2] | 1.0 |

[1] $(NH_2CH_2CH_2CH_2SiO_{3/2})_{0.5}(\phi SiO_{3/2})_{0.5}$.
[2] $(NH_2CH_2CH_2CH_2SiO_{3/2})_{0.5}(CH_2=CHSiO_{3/2})_{0.5}$.

[2] $(NH_2CH_2CH_2CH_2SiO_{3/2})_{0.5}(\phi SiO_{3/2})_{0.5}$.

The finished steel panels were allowed to air dry for 16 hours. A steel panel of the same size and type was used without a finish and served as control. All panels were placed in the 100 percent relative humidity chamber at 30-33° C. for 5 days. After this time the panels were removed and the amount of corrosion due to rusting was observed. The unfinished panel was severely corroded. All aminoalkylsilicone-epoxy adduct finished panels showed none to only a small amount of corrosion.

EXAMPLE 8

Galvanized steel panels were cleaned in this instance by scouring with an alkaline cleanser, flushed with water, and then dried. They were then finished with the four aminoalkylsilicon-epoxy adducts described in Example 7 and allowed to air dry for 16 hours. This treatment left a film of approximately 0.03-0.05 mil in thickness. These panels were then subjected to the "white rust" test and degree of white rusting observed. The test is made by laying the galvanized plate on its side and pouring a quantity of distilled water on the panel. A glass plate is then placed on top of the wet galvanized plate. Each 24 hours the water is replenished under the glass plate since it evaporates. An unfiished galvanized steel panel served as control. Within 24 hours the control had about 50 percent "white rust" under the glass plate and in 2 days it was completely white rusted. All aminoalkylsilicone-epovy adduct finished panels were completely free from any signs of white rust in 3 days' testing.

EXAMPLE 9

A total of 4 teaspoons having a silver surface were given the following treatments. Spoon No. 1 was untreated and served as a blank or control. Spoon No. 2 was coated with a 1.0-2.0 mil thickness of an epoxy resin by immersing the spoon in a toluene solution of a 40 weight percent resin having the formula:

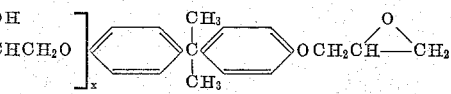

where $x$ has a value of 10-15. The spoon force dried by heating 90 minutes at 80° C. Spoon No. 3 was treated with a 0.03-0.05 mil thickness coating of the following aminoalkylsilicone terpolymer:

$(NH_2[CH_2]_3SiO_{3/2})_{0.5}(\phi SiO_{3/2})_{0.4}(Me_2SiO)_{0.1}$ which was 7.5 percent solids in a solution of 7 weight percent ethanol, 3 weight percent monoethyl ether of diethylene glycol, 54 weight percent toluene, and 36 weight percent of the monomethyl ether of ethylene glycol. This finish was set by heat curing 30 minutes at 150° C. Spoon No. 4 was finished with 0.03-0.05 mil film of the following aminoalkylsilicon-epoxy adduct: exactly 2.0 amino hydrogen equivalents of the aminoalkylsilicone compound used for spoon No. 3 plus 1 epoxy equivalent of the diglycidyl ether of bis phenol A having an epoxy equiv. wt. of 192. This adduct was prepared by mixing the two compounds such that the solids concentration was 7.5 weight percent and the solvent system employed was that described for spoon No. 3. This solution was allowed to ripen for 24 hours. A finish was applied by wholly dipping the spoon into the solution allowing it to drain dry. The finish was set by allowing the treated article to stand 16 hours at room temperature. All four spoons were then boiled for 1 hours in a 1 percent alkaline detergent solution having a pH of 10. After this treatment, it was observed that the film on spoon No. 2 had lifted completely. There was no apparent film attack on spoons Nos. 3 and 4. All four spoons were then partially immersed in a 0.1 percent sodium sulfide solution. Within 15 minutes spoons Nos. 1 and 2 were completely blackened on the areas immersed in the alkaline sulfide solution. After 24 hours spoons Nos. 1 and 2 also became tarnished in the areas suspended above the sodium sulfide solution. Tarnishing in this area apparently is by vapor phase corrosion under acidic conditions. Proof for the existence of acid sulfide gas over the alkaline solution is readily obtained by smelling the characteristic odor of the vapor. Spoon No. 3, after 24 hours' immersion in sulfide solution, showed severe corrosion and tarnishing of the immersed area and there were even tarnished areas in the acid gas exposed region above the solution showing a breakdown of the coating. However, spoon No. 4 was bright and shiny and showed no evidence whatsoever of film breakdown or even any slight degree of tarnish.

This example conclusively established the superiority of an aminoalkylsilicone-epoxy mixture in preserving silver surfaces from corroding and tarnishing when compared to the best heretoforeknown aminoalkylsilicone resins and epoxy resins which were used for this purpose.

EXAMPLE 10

Silver plated teaspoons were finished with the following aminoalkylsilicon-epoxy adducts and given exactly the same exposure as described in Example 9. In all instances the treating solution was 7.5 percent solids and the solvent was comprised of 8 percent ethanol, 2 percent monethyl ether of diethylene glycol, 54 percent toluene, 36 percent of the monomethyl ether of ethylene glycol. The spoons were dipped in the treating solution, allowed to drip dry, and were cured 16 hours by standing at room temperature. The adducts were prepared by ripening them for 1 to 3 days at room temperature in a 7.5 percent solids solution in the above noted solvent system.

exposure to the sulfide atmosphere the aminoalkylsilicone-epoxy finished articles were still showing 100 percent resistance to tarnishing. The color and luster of the coated silver objects had not changed in any respect after 3 months of this very severe test.

The finished articles were struck severe blows with a ball peen hammer and immersed in an alkaline sulfide solution (sodium sulfide solution) to test for flakeoff or rupture of the finish. The only visual effect on the finish was a pinpoint discoloration at the points of impact.

Corrosion was evident only at the point of impact and not anywhere else on the finished surface after immersion in an alkaline sulfide solution.

EXAMPLE 12

A total of four copper panels were cleaned and treated in the following manner: Panel No. 1 was not treated but was used as control with which we compared the improvements of my invention. Panel No. 2 was coated with 0.03–0.05 mil thick coating of a gamma-aminopropylsilicone ($NH_2CH_2CH_2CH_2SiO_{3/2}$) by immersing it in a 10 percent solution of the silicone in ethanol. Panel No. 3 was coated with 0.03–0.05 mil thick coating of a gamma aminopropylphenylsilicone copolymer $(NH_2(CH_2)_3SiO_{3/2})_{0.5}(\phi SiO_{3/2})_{0.5}$ by immersing it in a 10 percent solution of the copolymer in alcohol. Both panels Nos. 2 and No. 3 were heat cured by a 15 minute bake at 150° C. Panel No. 4 was immersed in a 10 percent solution of an aminosilicone-epoxy adduct containing two amino hydrogen equivalents of the gamma-aminopropylphenylsilicone copolymer shown above and

| Amino Hydrogen Equivalents of the Indicated Aminoalkylsilicone Compounds | Epoxy Equivalents | Adduct Number |
|---|---|---|
| 1.0 $[NH_2(CH_2)_3SiO_{3/2}]_{0.5}[\phi SiO_{3/2}]_{0.5}$ | [1] 1.0 | 1 |
| 1.0 $[NH_2(CH_2)_3SiO_{3/2}]_{0.5}[\phi SiO_{3/2}]_{0.5}$ | [1] 0.8 | 2 |
| 1.0 $[NH_2(CH_2)_3SiO_{3/2}]_{0.5}[\phi SiO_{3/2}]_{0.5}$ | [1] 0.6 | 3 |
| 1.0 $[NH_2(CH_2)_3SiO_{3/2}]_{0.5}[\phi SiO_{3/2}]_{0.5}$ | [1] 0.4 | 4 |
| 1.0 $[NH_2(CH_2)_3SiO_{3/2}]_{0.5}[\phi SiO_{3/2}]_{0.5}$ | [1] 0.2 | 5 |
| 1.0 $[NH_2(CH_2)_3SiO_{3/2}]_{0.5}(\phi SiO_{3/2})_{0.4}[Me_2SiO]_{0.1}$ | [1] 1.0 | 6 |
| 1.0 $[NH_2(CH_2)_3SiO_{3/2}]_{0.5}(\phi SiO_{3/2})_{0.4}[Me_2SiO]_{0.1}$ | [1] 0.8 | 7 |
| 1.0 $[NH_2(CH_2)_3SiO_{3/2}]_{0.5}(\phi SiO_{3/2})_{0.4}[Me_2SiO]_{0.1}$ | [1] 0.6 | 8 |
| 1.0 $[NH_2(CH_2)_3SiO_{3/2}]_{0.5}(\phi SiO_{3/2})_{0.4}[Me_2SiO]_{0.1}$ | [1] 0.4 | [4] 9 |
| 1.0 $[NH_2(CH_2)_3SiO_{3/2}]_{0.5}(\phi SiO_{3/2})_{0.4}[Me_2SiO]_{0.1}$ | [1] 0.2 | 10 |
| 1.0 $[NH_2(CH_2)_3SiO_{3/2}]_{0.5}[CH_2=CHSiO_{3/2}]_{0.5}$ | [1] 1.0 | 11 |
| 1.0 $[NH_2(CH_2)_3SiO_{3/2}]_{0.5}[C_5H_{11}SiO_{3/2}]_{0.5}$ | [1] 1.0 | 12 |
| 1.0 $[NH_2(CH_2)_3SiO_{3/2}]_{0.5}(\phi SiO_{3/2})_{0.3}(C_5H_{11}SiO_{3/2})_{1.2}$ | [1] 1.0 | 13 |
| 1.0 $[NH_2(CH_2)_3SiO_{3/2}]_{0.5}(\phi SiO_{3/2})_{0.3}(Me_2SiO)_{1.2}$ | [1] 1.0 | 14 |
| 1.0 $[NH_2(CH_2)_3SiO_{3/2}]_{0.5}(\phi SiO_{3/2})_{0.5}$ | [2] 1.0 | 15 |
| 1.0 $[NH_2(CH_2)_3SiO_{3/2}]_{0.5}(\phi SiO_{3/2})_{0.5}$ | [3] 0.15 | |
| 1.0 $[H_2N(CH_2)_3SiO_{3/2}]_{0.32}[MeSiO_{3/2}]_{0.10}[Me_2SiO]_{0.31}[\phi SiO_{3/2}]_{0.24}[\phi_2SiO]_{0.03}$ | [1] 0.2 | 16 |

[1] Diglycidyl ether of bis phenol A having an epoxy equivalent weight of 192.
[2] Triglycidyl ether of glycerine having an epoxy equivalent weight of 87 to 120.
[3] An epoxy polymer of the diglycidyl ether of bis phenol A having an epoxy equivalent weight of 450 to 525.
[4] When a solution of this composition is prepared in 2 percent and 1 percent concentrations in an aerosol formulation, and sprayed onto silver and copper surfaces and dried, excellent resistance to corrosion is obtained.

All of the above-identified compositions clearly showed substantial protection when applied to silverware and subjected to the defined corrosive environment of Example 9.

EXAMPLE 11

Sterling silver creamer and sugar tableware and silver-plated creamer and sugar tableware were finished with a composition containing 7.5 percent of an aminosilicone-epoxy adduct in a mixture of solvents comprising 7.5 percent ethanol, 2.5 percent monoethyl ether of diethylene glycol, 56 percent toluene, and 36 percent of the monomethyl ether of ethylene glycol. The aminosilicone-epoxy adduct was made by ripening a mixture of $(NH_2[CH_2]_3SiO_{3/2})_{0.5}(Me_2SiO)_{0.1}(\phi SiO_{1.5})_{0.5}$ and diglycidyl ether of bis phenol A having an epoxy equivalent weight of 192, in the relative amounts containing 2 amino hydrogen equivalents for each equivalent. The articles were allowed to air dry for 16 hours then placed in an atmosphere containing small amounts of moist $H_2S$ gas. Untreated sterling silver and silver-plated articles were used as control. Within 24 hours, the untreated articles were badly tarnished. After 3 months' one epoxy equivalent of the diglycidyl ether of bis phenol A having an epoxy equivalent wt. of 192. The solvent was comprised of 20 percent ethanol, 48 percent toluene, and 32 percent of the monomethyl ether of ethylene glycol. This panel was allowed to drain dry and air cured by standing 16 hours at room temperature.

All four panels were then partially immersed in 0.1 percent sodium sulfide solution for 24 hours. The degree of corrosion was observed by periodic observation. Within 1 minute, the untreated panel (panel No. 1) was completely darkened where immersed in the sulfide solution. Panel No. 2 in 1.5 hours and panel No. 3 in 24 hours showed 100 percent corrosion when immersed in sulfide solution. The aminoalkylsilicone treatments on panels Nos. 2 and No. 3, however, did present vapor phase acid sulfide attack for 24 hours. Of course, the blank panel was completely stained by vapor phase attack. Panel No. 4 which contained only a 0.03–0.05 mil thick film of the aminoalkylsilicone-epoxy resin showed 100 percent resistance to corrosion after 24 hours' exposure to this reagent. This test conclusively establishes the finish of the aminoalkylsilicone-epoxy reaction product as being superior to the aminoalkylsilicone finish for the protection of copper.

EXAMPLE 13

In a similar corrosive test on copper as described in Example 12, the following epoxy variations in the aminoalkylsilicone-epoxy adduct to show the general utility of mixtures of trifunctional and difunctional epoxy compounds were tested. All solutions were 10 percent of aminoalkylsilicone-epoxy adduct in 48 parts toluene, 32 parts of the monomethyl ether of ethylene glycol and 20 perecnt ethanol. Each adduct was prepared from the amounts of aminoalkylsilicone, triglycidyl ether of glycerine, and diglycidyl ether of bis phenol A shown in the table. The solutions were allowed to ripen a minimum of 24 hours.

| Amino Hydrogen Equivalents of $(NH_2(CH_2)SiO_{3/2})_{0.5}(\phi SiO_{3/2})_{0.5}$ | Triglycidyl Ether of Glycerine (Epoxy Equivalents) | Diepoxy Endblocked Polymers Diglycidyl Ether of Bis phenol A | |
|---|---|---|---|
| | | Epoxy Equivalents | Epoxy Equivalent wt. |
| 2.0 | 1.0 | 0.03 | 2,500 |
| 2.0 | 1.0 | 0.05 | 1,700 |
| 2.0 | 1.0 | 0.15 | 500 |

Copper panels were finished with these solutions, allowed to drain dry and then were air cured 16 hours prior to immersion in the 0.1 percent sodium sulfide solution. All of these panels withstood 24 hours' immersion without showing any darkening whatsoever. The blank copper panel was completely sulfided black in 2–3 minutes in this test.

EXAMPLE 14

To further show the utility of a wide variety of epoxy compounds with aminoalkylsilicone compounds as metal finishes for the prevention of corrosion, the following epoxy compounds were mixed in amounts providing the listed epoxy equivalents and allowed to ripen with amounts of aminosilicone containing 2 amino hydrogen equivalents of the gamma-aminopropylphenylsilicone copolymer $(H_2N[CH_2]_3SiO_{3/2})_{0.5}(\phi SiO_{3/2})_{0.5}$.

| Composition No. | Epoxy Equivalents | Epoxy Compounds |
|---|---|---|
| 1 | 1.0 | 1,2-epoxyethylbenzene. |
| 2 | 2.0 | 1,2-epoxyethylbenzene. |
| 3 | 1.0 | Phenylglycidyl ether. |
| 4 | 1.0 | Butylglycidyl ether. |
| 5 | 1.0 | 1,2-epoxyoctane. |
| 6 | 1.0 | 1,2-epoxyoctadecane. |
| 7 | {0.2, 0.8} | Phenylglycidyl ether and Diglycidyl ether of bis phenol A having an epoxy equivalent weight of 192. |
| 8 | {0.9, 0.1} | Phenylglycidyl ether. Triglycidyl ether of glycerine. |
| 9 | 1.0 | Triglycidyl ether of glycerine. |
| 10 | {1.0, 0.15} | Triglycidyl ether of glycerine and Epoxy endblocked polymer of diglycidyl ether of bis phenol A having an epoxy equivalent weight of 500. |

The above formulations were compounded at 7.5 to 10 percent of solids in the following solvent system: toluene—54 percent, ethanol—10 percent, monomethyl ether of ethylene glycol—36 percent. All compositions except No. 7 were ripened by aging 1 week at 70° C. Composition No. 7 was ripened by refluxing for 6 hours.

All the above listed compositions were applied to clean steel panels and allowed to drain dry. They were air cured 16 hours prior to immersion in the aerated 3 percent salt bath. An untreated clean steel panel that served as control, showed essentially 100 percent corrosion after immersion for 3 hours in this brine solution. After 8 hours' immersion, the panels coated with composition Nos. 1 through 7 showed absolutely no evidence of corrosion. The panels coated with composition Nos. 8, 9 and 10 showed only about 5–10 percent corrosion at this point.

EXAMPLE 22

A mixture of 0.1 mole of $NH_2(CH_2)_3Si(OEt)_3$, 0.1 mole of $C_6H_5Si(OEt)_3$ and 0.1 epoxy equivalent of diglycidyl ether of bis phenol A (epoxy equivalent wt. of 192) were charged to an 8 oz. glass jar. The contents were mixed and then the jar placed in a 70° C. oven for 7 days. At the end of this time, three portions of the viscous resin were separately diluted to 20 percent solids in the following solvents: toluene, a solvent mixture containing 50 weight percent of toluene and 50 weight percent of the monomethyl ether of ethylene glycol, and "Solvesso 150" (a proprietary aromatic-aliphatic solvent whose properties have been previously described). These solutions were applied by flooding on clean steel plates and allowed to drain dry. These panels were then air cured at room temperature for 16 hours then immersed in the aerated 3 percent salt solution. The untreated blank corroded completely within 3 hours. The treated panels withstood 8 hours' immersion in this corrosive environment without any significant evidence of corrosion.

EXAMPLE 16

Aminoalkylsilicone-epoxy adducts were prepared by mixing the following reactants in the proportions listed and ripening them under the condition defined below.

| Composition No. | Moles of $NH_2(CH_2)_3Si(OEt)_3$ | Moles of $\phi Si(OEt)_3$ | Moles of $MeSi(OEt)_3$ | Epoxy Equivalents of Diglycidyl Ether Bis Phenol A (epoxy equivalent wt. 192) |
|---|---|---|---|---|
| 1 | 1.0 | 1.0 | | 0.33 |
| 2 | 1.0 | 0.2 | | 1.0 |
| 3 | 1.0 | | 0.8 | 1.0 |
| 4 | 1.0 | 1.0 | | 1.0 |

Composition No. 1 stored 10 days at 70° C. without solvent, then diluted to 20 percent solids in toluene.
Composition No. 2 stored 4 days at 70° C. without solvent, then diluted to 20 percent solids in a solvent mixture containing 50 wt. percent of toluene and 50 wt. percent of the monomethyl ether of ethylene glycol.
Composition No. 3 refluxed 24 hours, as 75 percent solids in toluene, then diluted to 20 percent solids in toluene.
Composition No. 4 diluted to 50 percent solids with toluene and fractionated out ethanol then diluted to 20 percent solids in toluene.

These solutions were then applied on clean steel panels and the panels were allowed to drain dry. The finishes were air cured 16 hours at room temperature, then placed in the aerated 3 percent salt bath. In 3 hours the untreated steel panel was completely rusted. After 8 hours' exposure to this corrosive environment, there was no evidence whatsoever of any rusting on the finished steel panels.

EXAMPLE 17

The following metals were cleaned and finished by flooding with a 20 percent solution of the aminopropylphenylsilicon-epoxy compound prepared as described in Example 15 in a 60 percent toluene, and 40 percent monomethyl ether of ethylene glycol mixture. The panels were allowed to drain dry and then cured 16 hours by standing at room temperature. A duplicate set of panels was heat cured 30 minutes at 150° C. These finished metals were then placed in an aerated 3 percent ammonium chloride solution. Control panels, similarly cleaned but unfinished, were immersed in the same corrosive environment. The rate of corrosion was observed periodically for the beryllium-copper alloy, brass, magnesium, nickel, steel, zinc and the tin-plated steel panels.

Since an aerated solution of ammonium chloride is particularly corrosive, some unfinished metals such as magnesium instantly reacted to release hydrogen and ammonia and became discolored with corrosion products. Other unfinished metals such as nickel are more resistant to corrosion and required longer periods of time to corrode in this environment. All metals thus finished resisted corrosion during this test and the results are listed:

| Amino Hydrogen Equivalents | Epoxy Equivalents of Diglycidyl Ether of Bisphenol A having an Epoxy Equivalent wt. of 192 |
|---|---|
| 2.0 $(NH_2[CH_2]_3SiO_{3/2})_{0.5}(C_6H_5SiO_{3/2})_{0.5}$ | 1.0 |
| 2.0 $(NH_2[CH_2]_3SiO_{3/2})_{0.5}(C_5H_{11}SiO_{3/2})_{0.5}$ | 1.0 |

These materials were allowed to air dry. After 16 hours' cure at room temperature, they were successively placed in the following corrosive environments. Fresh untreated aluminum panels were used as controls in each test.

Test No. 1: 100 percent relative humidity at 70° C.

| Base Metal | Corrosion Observations | | |
|---|---|---|---|
| | Curing of Finished Panels | | Untreated Control Panel |
| | Air Dry 16 Hours | Cure 30 Minutes at 150° C. | |
| Magnesium | No corrosion in 1 hour | Slight staining | Instantly reacts to evolve gas and discolors. |
| Zinc | Pitting in 24 hr | Slight attack in 24 hr | Severe corrosion develops within 1 hr. |
| BeCu Alloy | No corrosion in 24 hr | | Severe corrosion rapidly occurs. |
| Brass | No corrosion in 24 hr | No corrosion in 24 hr | Severe corrosion, dezincification. |
| Steel | No corrosion in 24 hr | No corrosion in 24 hr | Severe corrosion. |
| Tin Plated Steel | Slight trace of corrosion, 72 hr | No corrosion in 72 hr | Severe corrosion with solution of tin. |
| Nickel | No discoloration in 72 hr | No discoloration in 72 hr | Some discoloration in 72 hr. |

EXAMPLE 18

Commercial chrome plated steel panels were prepared by flash electro plating successive layers of copper, nickel, and chromium on the steel surface. These bright metal panels were cleaned by scouring with alkaline detergent, washed, and dried. Onto one panel, there was flooded a 20 percent solution of the aminoalkylsilicon epoxy compound in toluene solution. The preparation of this resin is described in Example 16, composition No. 1. The panel was allowed to drain dry and air cured for 3 weeks. An untreated panel was used as control.

A corrosive test solution was prepared by mixing the following materials:

7.0 cc. of 0.5 percent $Cu(NO_3)_2 \cdot H_2O$
33.0 cc. of 0.5 percent $FeCl_3 \cdot 6H_2O$
10.0 cc. of 10 percent $NH_4Cl$
30.0 g. of ceramic type kaolin $(Al_2O_3 \cdot 2SiO_2 \cdot 2H_2O)$ This slurry was painted on both the finished and control panel. In less than 1 hour the corrosive solution dried on the panels. These panels were then placed inside a 90–100 percent non-condensing humidity cabinet maintained at 100° F. After 24 hours the chrome panels were removed from the humidity cabinet and the following observations were made. The control panel was attacked and rusting occurred all over the panel. The finished panel showed no evidence of any pitting or corrosion. This finished panel was then rigorously scrubbed and washed, then given a second application of the corrosive solution. After air drying of the corrosive material, the panel was replaced in the humidity chamber for an additional 24 hours. Absolutely no corrosion occurred on the finished panel under this particularly severe test.

EXAMPLE 19

Aluminum panels were scoured with alkaline cleanser, washed, and dried. They were then flooded with the following aminoalkylsilicone-epoxy compositions and allowed to drain dry. The solvent employed had a 60:40 weight ratio of toluene, to monomethyl ether of ethylene glycol.

Test No. 2: 20 percent salt fog in a 100° F. spray chamber.

In test No. 1 the untreated panel was severely stained in 1 hour and the finished panel showed no evidence of corrosion 24 hours later when the test was terminated.

In test No. 2 the untreated aluminum panel was stained badly within 2 days and the aminoalkylsilicone-epoxy finished panels showed no corrosion after 2 months at which point the test was discontinued.

EXAMPLE 20

*Wax modified formulation*

A "wax" containing aminoalkylsilicone-epoxy composition was prepared as follows:

Melt 25 grams of "Halowax 1013"[3] and 25 grams of "Arochlor 1254"[4] by heating to 100° C. Add 50 grams of toluene and obtain a clear solution by stirring. This solution contained 50 percent "wax" and is identified as Solution A.

Solution B was prepared by refluxing 1 mole of $NH_2(CH_2)_3Si(OEt)_3$, 1 mole of $C_6H_5Si(OEt)_3$, and 1 epoxy equivalent of the diglycidyl ether of bis phenol A having an epoxy equivalent wt. of 192 for 4 hours. This material was then diluted to 10 percent solids with toluene. Solution B, 19 grams, Solution A, 0.2 gram, and toluene, 0.8 gram, were mixed to give a 20 gram solution containing 10 percent solids. The solids contained 95

---

[3] Halowax 1013 is mainly a chlorinated naphthalene, that is characterized by the following data:
Form _____ Solid light yellow wax.
Sp. gr. _____ 1.67 g./cc.
Composition _____ Tetrachlor- and pentachlor-naphthalenes.
Chlorine content _ 56 percent (approx.).
Boiling point _____ About 328° C. at 760 mm. Hg pressure.
Softening point __ 120° C. (approx.).
[4] Arochlor 1254 is mainly chlorinated biphenyl or polyphenyl, produced by Monsanto Chemical Company, St. Louis, Missouri, characterized by the following properties:
Form _____ Light yellow viscous oil.
Sp. gr. 25/25° C. _____ 1.445 g./cc.
Distillation range _____ 340–375° C. at 760 mm. Hg pressure.
Refractive index D 20° C. _ 1.630–1.631.

percent aminoalkylsilicone-epoxy compound and 5 percent "wax."

A second wax-aminoalkylsilicone-epoxy compound was prepared in essentially the same manner except that the 10 percent solids solution contained 90 percent aminoalkylsilicon-epoxy compound and 10 percent "wax."

These two "wax" formulations were flooded on clean steel panels, allowed to drain dry and then aged 16 hours at room temperature. These finished panels were placed in an aerated 3 percent $NH_4Cl$ solution for 24 hours. As control the wax-free aminoalkylsilicon-epoxy adduct was used.

After 24 hours' exposure to this corrosive environment, the films produced by both "wax" formulations showed some superiority to resisting corrosion even over the films applied from the "wax"-free polymer.

EXAMPLE 21

Two pieces of brass were cleaned by scouring with alkaline cleanser, washed with water and then dried. These panels were then dipped in the aminoalkylsilicone-epoxy solution described in Example 11. The panels were allowed to drain dry and were cured by standing 16 hours at room temperature. One panel was dipped in 5 percent HCl in water for a period of 24 hours. The other panel was covered with a aqueous slurry of Portland cement which was allowed to dry and harden for 24 hours. After this period the brass specimens were washed with water and immersed 30 minutes in 0.1 percent potassium sulfide solution to see if there was any attack on the film as indicated by corrosion of the treated brass strip. By comparison with an untreated panel of brass the corrosion preventing properties of the film were clearly demonstrated. This was totally unexpected since it is well known that strong acids and alkalis readily attack siloxane linkages. In addition strong acid would be expected to attack an aminoalkylsilicone group and solubilize it.

EXAMPLE 22

Using 4-oz. glass jars as reaction containers, there were charged the reactants and solvents in the specific proportions as defined in Table A. The samples were allowed to react at the specified temperature and for a specified period of time as described in Table B prior to diluting to application strength. The diluting solvent was in each case a solvent mixture containing 50 wt.-percent of toluene and 50 wt.-percent of the monomethyl ether of ethylene glycol.

These nine solutions were applied to clean 3 x 6 in. steel panels by flooding. The panels were allowed to drain dry in a vertical position. The film thickness in each case was approximately 0.03–0.05 mil. After a 16-hr. cure at room temperature, the finishes were assumed to be cured and were then ready for exposure in the corrosive environment. An untreated steel panel was used as a control.

The panels were immersed in an aerated 3 weight percent aqueous sodium chloride solution for 16 hrs. They were removed and a visual observation indicated the percentage of rusting that occurred on the metal surface. The panels were air dried for 24 hrs. and then recycled in the salt water. The total amount of rusted surface was then recorded. An untreated piece of steel was used as a control in this experiment. It was observed 4 hrs. after immersion in the 3 percent salt solution that the untreated steel panel was completely rusted. All the aminoalkylsilicon-epoxy finished panels were substantially free of rust at this point. The degrees of rusting for the finished steel specimens at the end of both the first and second 16-hr. cycle in water are listed in Table A. This test unequivocably proves that adducts prepared from a large variety of aminoalkylsilicon and epoxy compounds provide finishes for steel which inhibit the corrosion when subjected to a corrosive environment.

TABLE A.—EVALUATION AS FINISHES FOR STEEL PANELS

| Composition No. | Moles of Silicon Compounds | Epoxy Equivalents | Application Concentration (Wt. Percent Solids) [1] | Percent Rust in Test After | |
|---|---|---|---|---|---|
| | | | | 1st Cycle | 2d Cycle |
| 1 | 1.0 $H_2N(CH_2)_4Si(OEt)_3$ plus 1.0 $\phi Si(OEt)_3$ | 1.0 Diglycidyl ether of bis phenol A [2] | 20 | 3 | 20 |
| 2 | 1.0 $HN[(CH_2)_3Si(OEt)_3]_2$ | do.[2] | 10 | 3 | 5 |
| 3 | 1.0  $CH_2N(CH_2)_3Si(OEt)_3$ plus 1.0 $\phi Si(OEt)_3$ | do.[2] | 20 | 0 | 5 |
| 4 | 1.0 $H_2N(CH_2)_4SiMe(OEt)_2$ | do.[2] | 20 | 1 | 2 |
| 5 | 1.0$[H_2N(CH_2)_4SiO_{3/2}]_{0.5}[\phi SiO_{3/2}]_{0.5}$ | do.[2] | 10 | 1 | 3 |
| 6 | 1.0$[H_2N(CH_2)_4SiMeO]_{0.36}[Me_2SiO]_{0.64}$ | do.[2] | 10 | 10 | 25 |
| 7 | 1.0$[H_2N(CH_2)_3SiO_{3/2}]_{0.5}[\phi SiO_{3/2}]_{0.5}$ | 1.0 $CH_2CH(CH_2)_2Si(OEt)_3$  | 10 | 2 | 3 |
| 8 | 1.0$[H_2N(CH_2)_3SiO_{3/2}]_{0.5}[\phi SiO_{3/2}]_{0.5}$ | 1.0 $CH_2CHCH_2OCH(CH_3)_2$  | 10 | 25 | |
| 9 | 1.0 $[H_2N(CH_2)_3SiO_{3/2}]_{0.5}[\phi SiO_{3/2}]_{0.5}$ | 1.0 3,4-epoxy-6-methylcyclohexylmethyl-3,4-epoxy-6-methylcyclohexanecarboxylate | 10 | 2 | 3 |

[1] Diluting solvent in all cases is a solvent mixture containing 50 wt. percent of toluene and 50 wt. percent of the monomethyl ether of ethylene glycol.
[2] Epoxy equivalent wt. of about 190–200.

TABLE B.—PREPARATION CONDITIONS

| Composition No. | Preparation Conditions | | | |
|---|---|---|---|---|
| | Wt. Percent Solids | Percent Solvent | Reaction Time | Reaction Temp., °C. |
| 1 | 100 | | 48 hr | 70 |
| 2 | 60 | 20 toluene; 20 monomethyl ether of ethylene glycol. | 24 hr | 70 |
| 3 | 100 | | 48 hr | 70 |
| 4 | 80 | 10 toluene; 10 monomethyl ether of ethylene glycol. | 24 hr | 70 |
| 5 | 31.4 | 40 ethanol; 14.3 toluene; 14.3 monomethyl ether of ethylene glycol. | 30 min | 70 |
| 6 | 66 | 17 toluene; 17 monomethyl ether of ethylene glycol. | 30 min | 70 |
| 7 | 63.3 | 36.7 ethanol | 48 hr | 25 |
| 8 | 55 | 45 ethanol | 48 hr | 70 |
| 9 | 58 | 42 ethanol | 1 hr | 70 |

EXAMPLE 23

Composition No. 2 of Example 16 was applied to a clean steel panel, allowed to drain dry and air cured for 16 hours at room temperature. The finished panel was then heated at 200° C. for 24 hours, then cooled to room temperature and immersed in the aerated 3 percent salt bath. After 8 hours' immersion there was no evidence whatsoever of any rusting.

Composition No. 2 of Example 16 was also applied to clean copper panels, allowed to drain dry and air cured at room temperature for 16 hours. The finished panel was bent over on itself several times and hammered to crease it. There was no visual evidence of damage to the finish. The panel was immersed in a 0.3 percent $Na_2S$ solution to determine if resistance to corrosion had been impaired by this mechanical beating. After 2 hours' immersion the panel showed no signs of corrosion whatsoever at the crease or anywhere else on the finished panel.

EXAMPLE 24

A siloxane copolymer of the unit formula:

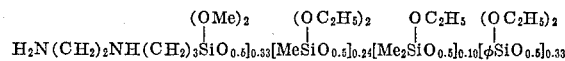

was prepared in an ethanol solution and 6.0 grams of the solution (50 percent solids) was mixed with 6.9 grams of a 50 percent solution of a mixture of di- and polyepoxides in toluene. Additional solvent in the form of a mixture of toluene (63.9 parts), n-butanol (13.7 parts) and $C_4H_9OCH_2CH_2OH$ (13.7 parts) was added to the mixture to provide a solution containing 5 percent by weight of solids and the resulting solution refluxed for a period of 24 hours. The refluxed solution was applied to a silver plated spoon by a dipping technique and the treated spoon air dried. The treated spoon was then placed in a one percent boiling aqueous commercially available detergent solution for one hour and examined. It was found that the silver spoon was not attacked by such treatment and that the applied film remained in excellent condition. The spoon was then subjected to a 0.1 percent sodium sulfide bath, after which it was again examined and found free of attack.

EXAMPLE 25

When siloxane copolymers having the following unit formula:

(a) $[CH_3NH(CH_2)_3SiO_{3/2}]_{0.5}[MeSiO_{3/2}]_{0.4}[\phi SiO_{3/2}]_{0.1}$ (b) 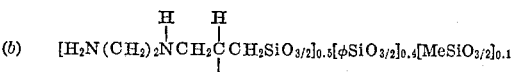

(c) 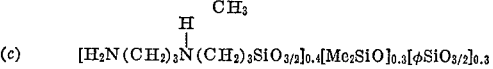

are respectively mixed with the diglycidyl ether of bisphenol A (having an epoxy epoxy equivalent wt. of 192) and a diluent comprising 60 parts toluene, 30 parts of the monomethyl ether of ethylene glycol and 10 parts n-butanol in amounts to provide 5 percent solution containing 1 amino hydrogen equivalent for 0.5 epoxy equivalent and the solution refluxed for six hours, the resulting compositions provide good corrosion resistance to silver, copper and aluminum surfaces.

EXAMPLE 26

A mixture of 1 mole gamma-aminopropyltriethoxysilane, 0.8 mole phenyltriethoxysilane and 0.2 mole dimethyldiethoxysilane was divided into three parts. One part was partially hydrolyzed with a theoretical amount of water to effect hydrolysis of 50 percent of all the silicon-bonded alkoxy groups, while the second part was partially hydrolyzed with a theoretical amount of water to effect hydrolysis of 33⅓ percent of all the silicon-bonded alkoxy groups. The third part was not hydrolyzed.

The partial cohydrolysis reactions were carried out in ethanol and there was obtained partial cohydrolysis products which comprised polysiloxanes containing an average of slightly less than 1.5 and slightly less than 2 alkoxy groups per silicon atom of the respective polymers.

The partial cohydrolysis products and the third non-hydrolyzed mixture referred to above were mixed with a mixture of di- and polyepoxides in the proportions of 1 amino hydrogen equivalent for each epoxy equivalent and a diluent mixture of toluene, butanol and a $C_4H_9OCH_2CH_2OH$ to provide solutions containing 10 percent by weight of solids. The mixtures were then heated at 70° C. and all found stable to gelation and precipitation when examined after three days. The solution prepared from the non-hydrolyzed silane mixture and the epoxy compound was stable for 93 days before some evidence of gelation was noted. The solution prepared from the one-third partial cohydrolysis product and the epoxy compound was stable for 19 days before some evidence of gelation was noted while the solution prepared from the one-half cohydrolysis product was stable for 5 days at 70° C. before a slight trace of gelation was noted.

In terms of providing corrosion resistance, the solutions prepared from the partial cohydrolysis products provide better protection. Such products are particularly useful in aerosol formulations.

EXAMPLE 27

It has been found that a 5 percent solution of a siloxane copolymer.

$[H_2N(CH_2)_3SiO_{3/2}]_{0.5}[\phi SiO_{3/2}]_{0.5}$ and the diglycidyl ether of bis phenol A (having an epoxy equivalent of 190) in the proportions of 2 amino hydrogen equivalents for each epoxy equivalent in a diluent mixture comprising 70 parts toluene, 25 parts monomethyl ether of ethylene glycol and 5 parts monobutyl ether of ethylene glycol prepared by refluxing the mixture for 6 hours in stable to gelation for 43 days at 70° C., for 124 days at 50° C., and for 495 days at 25° C.

To illustrate the effect of the additional other diluents on stability, including diluents which in epoxy-organic amine systems would increase the cure rate, as for example diluents which would contain alcoholic hydroxyl groups, a solution identical to that set forth above was prepared and divided into 5 parts. To each part of the 5 percent solutions was added 0.25 part of certain diluents as indicated in the table below and the resulting change in stability to gelation noted.

| No. | Concen. of Amino-organo-silicon-epoxy cpds. in mixture, percent | Solvent Added to Solution (approx.) | Days Required For Gelation at— | | |
|---|---|---|---|---|---|
| | | | 25° C. | 50° C. | 70° C. |
| 1 | 5 | 0 | 495 | 124 | 43 |
| 2 | 4 | ¼ part of same solvent.[1] | 565 | 301 | 76 |
| 3 | 4 | ¼ part toluene.[1] | 630 | 228 | 61 |
| 4 | 4 | ¼ part methylisobutyl ketone.[1] | >672 | >672 | 459 |
| 5 | 4 | ¼ part ethanol.[1] | >672 | >672 | >672 |
| 6 | 4 | ¼ part butanol.[1] | >672 | >672 | >672 |

[1] Per each part of the solvent in the 5% mixture.

The compositions containing 4% by weight of the amino-organosilicon-epoxy compounds provide excellent corrosion resistance to silver surfaces.

EXAMPLE 28

Compositions were prepared by forming the following mixtures:

*Mixture I.*—A solution comprising (a) copolymer prepared by the two-thirds hydrolysis of a mixture of equal molar amounts of gamma-aminopropyltriethoxysilane, phenyltriethoxysilane and methyltriethoxysilane, (b) a diglycidyl ether of 4,4'-dihydroxydiphenyl-2,2-propane and (c) a solvent consisting of 90 parts toluene, 5 parts n-butanol and 5 parts the monobutyl ether of ethylene glycol (solvent comprising 90 percent by weight of the mixture).

*Mixture II.*—A solution comprising (a) a copolymer of fifty mole percent gamma-aminopropylsiloxane units, forty mole percent phenylsiloxane units and ten mole percent methylsiloxane units, (b) a diglycidyl ether of 4,4'-dihydroxydiphenyl-2,2-propane and (c) a solvent consisting of 70 parts toluene, 25 parts of monomethyl ether of ethylene glycol and 5 parts of the monobutyl ether of ethylene glycol (solvent comprising 95 percent by weight of mixture).

*Mixture III.*—A solution comprising (a) a copolymer of gamma-aminopropylsiloxane units and phenylsiloxane units, (b) a diglycidyl ether of 4,4'-dihydroxydiphenyl-2,2-propane and (c) a solvent consisting of 70 parts toluene, 25 parts of the monomethyl ether of ethylene glycol and 5 parts of the monobutyl ether of ethylene glycol (solvent comprising 95 percent by weight of mixture).

Shortly after the mixtures set forth above were prepared they were employed in the process of this invention to improve the corrosion resistance of silver, copper and steel articles by applying such mixtures to the surfaces of such articles and heating to produced cured finishes. It was noted that the total of nine finished silver, copper and steel articles so prepared thereby, when subjected to corrosive atmospheres, exhibited remarkably good corrosion resistance properties.

Mixtures of the same composition as Mixtures I, II, and III set forth above were, after their preparation, heated to the reflux temperatures of the respective mixtures (about 100–110° C.) for periods of from 8 to 24 hours to form solutions of curable adducts of the respective amino-organosilicon compounds and epoxy compounds. The three solutions of the curable adducts of Mixtures I, II, and III were employed to improve the corrosion resistance of silver, copper and steel articles by applying such solution of curable adducts to the surfaces of such articles and heating to produce cured finishes. It was noted that the total of nine finished silver, copper and steel articles prepared thereby, when subjected to corrosive atmospheres, exhibited improved corrosion properties as compared with the remarkably good results obtained when such mixtures were employed in the process immediately after their preparation as hereinabove described.

In connection with the preparation and use of the above referred to mixtures a study of the stability characteristics thereof was made.

Mixtures identical to those hereinabove identified and defined as Mixtures I, II, III were prepared. Such mixtures were first heated to their reflux temperatures for periods of from 8 to 24 hours. It was noted that during such refluxing the compositions remained in the form of a solution with no evidence of gelation or precipitation in such compositions.

The mixtures after refluxing were then stored at various temperatures to determine what effect such conditions would have on the refluxed mixtures. The following was noted:

| Mixture | Concentration of Aminesilicone and Epoxy Cpds. in Mixture, Percent | Amine Hydrogen Epoxy Equiv. | Days required for precipitation or gelation | | |
|---|---|---|---|---|---|
| | | | 70° C. | 50° C. | 25° C. |
| I | 10 | 1.0 | 7 | 10 | 25 |
| IA [1] | 7.5 | 1.0 | 141 | 267 | 374 |
| II | 5.0 | 2.0 | 120 | 337 | [2] >345 |
| III | 5.0 | 2.0 | 43 | 124 | [2] >495 |

NOTE.—All compositions first refluxed from 8 to 24 hours.

[1] Same as Mixture I but diluted after preparation to concentration indicated.
[2] No precipitation or gelation, test then discontinued.

These results show that these compositions of this invention are remarkably stable.

Similar tests were carried out with respect to the stability of mixtures of organic amines and epoxy compounds in solvent systems in various dilute concentration and that such tests were carried out with solution of a diglycidyl ether of 4,4'-dihydroxydiphenyl-2,2-propane and diethylene triamine in a solvent consisting of 90 parts toluene, 5 parts of the monobutyl ether of ethylene glycol and 5 parts butanol. In each of the tests the epoxy compound and the organic amine employed were the same and the following results were obtained:

| Mixture | Concentration of Amine and Epoxy Cpds. in Solvent | Amine Hydrogen Epoxy Equiv. | Time for Gelation or Precipitation | | |
|---|---|---|---|---|---|
| | | | 70° C. | 50° C. | 25° C. |
| A | 10 | 1 | <16 hrs.[1] | <16 hrs.[1] | 1–3½ days.[2] |
| B | 7.5 | 1 | <16 hrs.[1] | <16 hrs.[1] | 2 days. |
| C | 5 | 1 | <16 hrs.[1] | 1 day | 3 days. |
| D | 5 | 2 | <16½ hrs. | 16–24 hrs. | 2–3 days.[3] |

[1] Test started at 4 p.m. and precipitation occurred prior to examination at 8 a.m. the next day.
[2] Precipitation had not occurred on Friday afternoon which completed 1 full day but precipitation occurred prior to examination on Monday morning at 8 a.m.
[3] Precipitation occurred between 2nd and 3rd days.

NOTE.—When a portion of mixture 4 was heated at reflux temperature (110° C.) precipitation occurred in two and one-half hours.

The latter results, when compared to the immediately preceding results, show that the compositions of this invention show relatively greater stability than solution of organic amines and epoxy compounds.

EXAMPLE 29

The experiments described below were performed in order to compare the properties of known metal silicone-epoxy metal coatings with the properties of metal finishes produced from a composition of this invention.

Part I

This experiment was performed to prepare a known silicone-epoxy coating composition and to coat a copper panel and a silver spoon therewith.

To a flask were added (1) 40.8 g. of a toluene-ethanol solution containing 21.3% by weight of a hydroxysilicone copolymer composed of 15 mole-percent bicycloheptylcarbinolsiloxy units
15 mole-percent monomethylsiloxy units
15 mole-percent monophenylsiloxy units and
55 mole-percent phenylmethylsiloxy units and (2) 3.8 g. of a toluene solution containing 50% by weight of an epoxy resin having an epoxy equivalent of about 187 and having the formula:

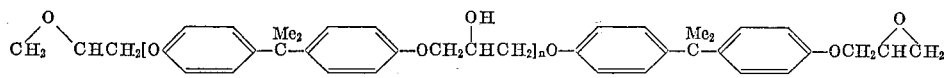

The amount of epoxy resin and hydroxysilicone copolymer employed was such that there was one hydroxyl group in the hydroxysilicone polymer per epoxy group in the epoxy resin. To the hydroxysilicone epoxy resin mixture so formed was added 8.5 g. methyl isobutyl ketone and 8.5 g. of butoxy ethylene glycol and the resulting mixture thoroughly stirred.

A copper panel was thoroughly cleansed by scouring with an alkaline abrasive cleanser, washing with water and wiping with a damp cloth which had been immersed in a citric acid mixture, washed again and then dried. The copper panel was coated with the above mixture using a brush technique and then suspended in air to allow the coating to drain dry overnight.

A silver plated soup spoon was cleansed with silver polish, wiped with a damp cloth which had been dipped in a citric acid mixture, washed and dried. The silver spoon was dipped in the hydroxysilicone-epoxy resin mixture prepared above and suspended on a support to allow the coating to drain dry overnight.

After standing overnight, the coatings on the panel and spoon had not cured and hence the specimens were heated for one hour at a temperature of 200° C. in an argon atmosphere. After removal from the oven, the coated specimens were allowed to cool to room temperature, examined and the coatings found tacky and apparently not fully cured. Since past experience had indicated (and the experiment described in Part IV below proved) that tacky coatings could be readily removed from metal substrates and hence would give poor performance in a test for corrosion and abrasion resistance, another coating was produced on a panel and spoon employing a catalyst to aid in the curing of the resin mixture as described below.

To the remaining amount of hydroxysilicone-epoxy resin mixture prepared above (approximately 61 g.) was added 0.1 g. of diethylene triamine and the catalyzed mixture applied to a copper panel and a silver spoon by the same technique employed above. The coatings were suspended and allowed to air dry for a period of about one hour. Inasmuch as the coatings did not cure during this period, the treated specimens were then heated in an argon atmosphere at a temperature of 250° C. for a period of 1.25 hr. After heating, the coatings were not tacky and were from about 0.1–0.2 mil thick.

Part II

This experiment was performed to prepare a composition of this invention and to finish a copper panel and a silver spoon therewith.

A mixture was prepared containing (1) an aminosilicone polymer composed of:

50 mole-percent gamma-aminopropylsiloxy units
10 mole-percent dimethylsiloxy units and
40 mole-percent phenylsiloxy units and (2) the epoxy resin disclosed in Part I above. The epoxy resin was employed in an amount that provided one epoxy equivalent per amino hydrogen atom in the aminosilicon polymer. The solvents employed were the same as those employed in Part I above.

The mixture so prepared was sprayed on a copper panel and a silver spoon. Past experience had shown that the aminosilicone-epoxy resin films would have cured by drying in air in about 1–2 hours. However a quicker cure was achieved by heating the panel and the spoon for 15 minutes at a temperature of 120° C. in an air circulating oven. The cured finish on the panel and spoon so produced were not tacky and were about 0.1 mil thick.

Part III

This experiment was performed to compare the properties of the non-tacky coating formed in Part I on a copper panel with the finish formed in Part II on a copper panel.

One copper panel was coated with the non-tacky hydroxysilicone-epoxy resin mixture, that was produced from a hydroxysilicone-epoxy mixture to which had been added diethylene triamine (as described in Part I). Another copper panel was finished with the aminosilicone-epoxy resin mixture (described in Part II). Both panels were half immersed in the boiling soap solution for one hour after which they were rinsed in tap water and dried. It was observed that the panel coated with the hydroxysilicone-epoxy resin mixture (diethylene triamine added) was to two shades. The immersed section of the panel was copper colored but somewhat darker than the original color while the non-immersed surface of the panel showed vapor-phase attack in that the copper substrate was darkened. The panel finished with the aminosilicone-epoxy resin mixture still possessed the original bright and shiny color and there was also no difference in color or shade between the immersed and non-immersed section of the panel.

Part IV

This experiment was performed to demonstrate that the tacky coatings produced on copper panels from hydroxysilicone-epoxy compositions (in the absence of a cure catalyst such as diethylene triamine) are also not satisfactory.

A copper panel was coated over one-half of its length with the tacky hydroxysilicone-epoxy resin mixture described in Part I (no diethylene triamine added) and finished over the other half of its length with the aminosilicone-epoxy resin mixture described in Part II. The mixtures were brush applied and the specimen was air dried for 30 minutes and subsequently heat cured for 8 minutes in an air oven at 200° C. After curing, the panel was immersed in a boiling soap solution for a period of one hour, removed and washed with cold water. The treated panel was then scrubbed with a mild alkaline abrasive cleanser over its entire surface for a few moments and then washed in tap water. It was noted that this scrubbing action completely removed the portion of the tacky coating produced from hydroxysilicone-epoxy resin mixture from the panel and that it did not effect the finish that had been produced from aminosilicone-epoxy resin mixture.

Part V

This experiment was performed to compare the properties of the non-tacky coating formed in Part I on a silver spoon with the finish formed in Part II on a silver spoon.

A silver spoon coated with the non-tacky hydroxysilicone-epoxy resin mixture as described in Part I (diethylene triamine added) and a silver spoon finished with the aminosilicone-epoxy resin mixture as described in Part II were immersed in a boiling solution containing 1% by weight of a soap solution for a period of one hour after which the spoons were removed, rinsed under tap water, and rubbed between the thumb and forefinger to determine the toughness and adhesion of the coatings. The hydroxysilicone-epoxy resin coating did not appear well bonded, whereas the aminosilicone-epoxy resin was well bonded and did not appear effected in any way by the boiling solution. The spoons were then immersed in an 0.5% sodium sulfide solution for a period of 15 minutes to determine what effect, if any, the rubbing action, as well as the soap test, had on the films. It was noted that the silver spoon coated with the hydroxysilicone-epoxy resin mixture turned black from sulfide attack at those areas which had been rubbed and some evidence of attack was found in areas which had not been rubbed. On the other hand, the spoon finished with the aminosilicone-epoxy resin showed no adverse effect to this sulfide attack.

As used herein "Me" denotes the methyl group, "Et" denotes the ethyl group, "φ" denotes the phenyl group and "Vi" denotes the vinyl group.

This application is a continuation-in-part of application Serial No. 691,475, filed October 21, 1957, now abandoned.

What is claimed is:

1. A curable finishing composition comprising a relatively stable solution of:
   (I) a member selected from the group consisting of:
       (1) a mixture of:
           (a) an amino-organosilane having at least one hydrocarbonoxy group bonded to silicon and at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group,
           (b) an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the amino-organosilane, and
       (2) curable adducts of (a) and (b); dissolved in
   (II) a volatile organic diluent in which said adduct, amino-organosilane and epoxy compound are soluble, said amino-organosilane and said epoxy compound being present in said solution in an amount up to about seventy-five percent by weight of said solution.

2. A curable finishing composition comprising a mixture of:
   (a) an amino-organosilane having at least one hydrocarbonoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group,
   (b) an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the amino-organosilane, and
   (c) a volatile organic diluent in which said amino-organosilane and epoxy compound are soluble, said amino-organosilane and said epoxy compound being present in said mixture in an amount up to about seventy-five percent by weight of said mixture, said mixture of said amino-organosilicon compound, said epoxy compound and said volatile organic diluent being in the form of a solution.

3. A curable finishing composition comprising a mixture of:
   (a) a siloxane copolymer composed in aminoalkylsiloxane units having at least one amino nitrogen atom connected to a silicon atom thereof through not less than three carbon atoms of a divalent hydrocarbon group and having from one to two amino hydrogen atoms bonded to said nitrogen atom and hydrocarbon siloxane units said siloxane copolymer containing from 0.1 to 2 silicon-bonded alkoxy groups per silicon atom, any valence of the silicon atoms in said siloxane copolymer that are not attached to oxygen atoms forming part of the siloxane chain, to said divalent hydrocarbon groups, and to said alkoxy groups being attached to a member selected from the group consisting of the monovalent hydrocarbon groups and the hydroxyl groups,
   (b) an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the siloxane copolymer, and
   (c) a volatile organic diluent in which said siloxane copolymer and epoxy compound are soluble, said volatile organic diluent comprising an aromatic hydrocarbon and at least one member selected from the class consisting of hydrocarbon ethers, hydrocarbon alcohols and hydrocarbon alcohol-ethers, said siloxane copolymer and said epoxy compound being present in said mixture in an amount up to about ten percent by weight of said mixture, said siloxane copolymer, said epoxy compound and said volatile organic diluent being in the form of a solution.

4. A curable finishing composition comprising a mixture:
   (a) a siloxane copolymer consisting essentially of units of the formula:

$[H_2N(CH_2)_3SiO_{3/2}][C_6H_5SiO_{3/2}][(CH_3)_2SiO]$ in which formula from 0.1 to 2 oxygen atoms per silicon atom are attached to alkyl groups so as to provide from 0.1 to 2 silicon-bonded alkoxy groups per silicon atom in the copolymer,
   (b) a diglycidyl ether of 4,4'-dihydroxydiphenyl-2,2-propane,
   (c) a volatile organic diluent in which said siloxane copolymer and said diglycidyl ether of 4,4'-dihydroxydiphenyl-2,2-propane is soluble, said volatile organic diluent comprising an aromatic hydrocarbon and at least one member selected from the class consisting of hydrocarbon ether, hydrocarbon alcohols and hydrocarbon alcohol-ethers, said mixture containing said diglycidyl ether of 4,4'-dihydroxydiphenyl-2,2-propane and said siloxane copolymer in the proportions of 0.05 to 1.5 epoxy equivalent for each amino hydrogen equivalent, said siloxane copolymer and said diglycidyl ether of 4,4'-dihydroxydiphenyl-2,2-propane being present in said mixture in an amount up to about seven and one-half percent by weight of said mixture, said mixture of said siloxane copolymer, said diglycidyl ether of 4,4'-dihydroxydiphenyl-2,2-propane and said volatile organic diluent being in the form of a solution.

5. A curable finishing composition comprising a mixture of a curable adduct of:
   (a) an amino-organosilane having at least one hydrocarbonoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group, and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organo-silane, and a volatile organic diluent in which said curable adduct is soluble, said curable adduct of said amino-organosilane compound and said epoxy compound being present in said mixture in an amount up to about fifty percent by weight of said mixture, said mixture of said curable adduct of said amino-organosilane compound and said epoxy compound and said volatile organic diluent being in the form of a solution.

6. A curable finishing composition comprising a mixture of a curable adduct of:
(a) a siloxane copolymer composed of aminoalkylsiloxane units having at least one amino nitrogen atom connected to a silicon atom thereof through not less than three carbon atoms of the alkyl group and having from one to two amino hydrogen atoms bonded to said nitrogen atom and hydrocarbon siloxane units, said siloxane copolymer containing from 0.1 to 2 silicon-bonded alkoxy groups per silicon atom, any valences of the silicon atoms in said siloxane copolymer that are not attached to oxygen atoms forming part of the siloxane chain, to said divalent hydrocarbon groups, and to said alkoxy groups being attached to a member selected from the groups consisting of the monovalent hydrocarbon groups and the hydroxyl groups, and
(b) an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the siloxane copolymer, and a volatile organic diluent in which said curable adduct is soluble, said volatile organic diluent comprising an aromatic hydrocarbon and at least one member selected from the class consisting of hydrocarbon ether, hydrocarbon alcohols and hydrocarbon alcohol-ethers, said curable adduct of said siloxane copolymer and said epoxy compound being present in said mixture in an amount up to about ten percent by weight of said mixture, said mixture of said curable adduct of said siloxane copolymer and said epoxy compound and said volatile organic diluent being in the form of a solution.

7. A curable finishing composition comprising a mixture of a curable adduct of:
(a) a siloxane copolymer consisting essentially of units of the formula:

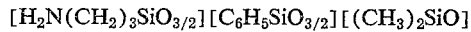

in which formula from 0.1 to 2 oxygen atoms per silicon atom are attached to alkyl groups so as to provide from 0.1 to 2 silicon-bonded alkoxy groups per silicon atom in the copolymer, and
(b) a diglycidyl ether of 4,4′-dihydroxydiphenyl-2,2-propane in the proportions of 0.05 to 1.5 epoxy equivalent for each amino hydrogen equivalent and a volatile organic diluent in which said adduct is soluble, said volatile organic diluent comprising an aromatic hydrocarbon and at least one member selected from the class consisting of hydrocarbon ethers, and hydrocarbon alcohols and hydrocarbon alcohol-ethers, said curable adduct of said siloxane copolymer and said diglycidyl ether of 4,4′-dihydroxydiphenyl-2,2-propane being present in said mixture in an amount up to about seven and one-half percent by weight of said mixture, said mixture of said curable adduct of said siloxane copolymer and said diglycidyl ether of 4,4′-dihydroxydiphenyl-2,2-propane and said volatile organic diluent being in the form of a solution.

8. A curable finishing compositon comprising a mixture of:
(a) a partial hydrolysis product of an amino-alkylalkoxysilane containing at least one amino nitrogen atom connected to silicon through not less than three carbon atoms of said aminoalkyl group and having from one to two amino hydrogen atoms bonded to said nitrogen atom any valence of the silicon atom in said amino-alkylalkoxysilane not satisfied by said aminoalkyl and alkoxy groups being attached to a monovalent hydrocarbon group and hydrocarbon alkoxysilanes said hydrocarbon alkoxysilanes containing no groups attached to silicon other than said hydrocarbon and alkoxy groups, said partial hydrolysis product containing from 0.1 to 2.5 silicon-bonded alkoxy groups per silicon atom,
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the siloxane polymer, and
(c) a volatile organic diluent in which said partial cohydrolysis product and said epoxy compound are soluble, said volatile organic diluent comprising an aromatic hydrocarbon and at least one member selected from the class consisting of hydrocarbon ethers, hydrocarbon alcohols and hydrocarbon alcohol-ethers, said cohydrolysis product and said epoxy compound being present in said mixture in an amount up to about 50% by weight of said mixture, said mixture of said cohydrolysis product, said epoxy compound and said volatile organic diluent being in the form of a solution.

9. A process for preparing a finishing composition comprising a solution of a curable adduct of an amino-organosilicon compound and an epoxy compound which comprises the steps of forming a mixture of:
(a) an amino-organosilane having at least one hydrocarbonoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group,
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organo-silane, and
(c) a volatile organic diluent in which said amino-organosilicon compound and epoxy compound are soluble, said mixture of said amino-organosilane compound, said epoxy compound and said volatile organic diluent forming a solution, said amino-organosilane compound and said epoxy compound being present in said mixture in an amount up to about seventy-five percent by weight of said mixture, subjecting said mixture to a temperature in the range of from about room temperature to the reflux temperature of said mixture to cause said amino-organosilane compound and said epoxy compound present in said mixture to partially react to form a curable adduct and provide a solution comprising said curable adduct and sail volatile organic diluent.

10. A process for preparing a finishing composition comprising a solution of a curable adduct of a partial hydrolysis product of an aminoalkylalkoxysilane and a hydrocarbonalkoxysilane and an epoxy compound which comprises the steps of forming a mixture of:
(a) a partial cohydrolysis product of an aminoalkylalkoxysilane having at least one amino nitrogen atom connected to silicon through not less than three carbon atoms of the aminoalkyl group and having from one to two amino nitrogen atoms connected to said nitrogen atom, any valence of the silicon atom in said aminoalkylalkoxysilane not satisfied by said aminoalkyl and alkoxy groups being attached to a monovalent hydrocarbon group and a hydrocarbon-alkoxysilane said hydrocarbonalkoxysilane containing no groups attached to silicon other than said hydrocarbon and alkoxy groups, said partial hydrolysis product containing from 0.1 to 2.5 silicon bonded alkoxy groups per silicon atom, (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the siloxane copolymer, and (c) a volatile organic diluent in which said partial cohydrolysis product and said epoxy compound are soluble, said volatile organic diluent comprising an aromatic hydrocarbon and at least one member selected from the class consisting of hydrocarbon ether, hydrocarbon alcohols and hydrocarbon alcohol-ethers, said mixture of said partial cohydrolysis product, said epoxy compound and said volatile organic diluent forming a solution, said partial cohydrolysis product and said epoxy compound being present in said mixture in an amount up to about seventy-five percent by weight of said mixture, subjecting said mixture to a temperature in the range of from about room temperature to the reflux temperature of said mixture to cause said partial cohydrolysis product and said epoxy compound present in said mixture to partially react to form a curable adduct and provide a solution comprising said curable adduct and said volatile organic diluent.

11. A process for improving the corrosion resistance of an article having a metallic surface which comprises the steps of finishing said article by applying to the metallic surface of said article a relatively stable solution comprising:

(I) a member selected from the group consisting of:
  (1) mixtures of:
    (a) an amino-organosilane having at least one hydrocarbonoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group, and
    (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organo-silane, and
  (2) curable adducts of (a) and (b) and (II) a volatile organic diluent in which said adduct, amino-organosilane compound and epoxy compound are soluble, said amino-organosilane compound and said epoxy compound being present in said solution in an amount up to about fifty percent by weight of said solution, and curing said coating on said metallic surface to form a cured finish of said solution on said article and provide said article with improved corrosion resistance.

12. A process for improving the corrosion resistance of an article having a metallic surface which comprises the steps of finishing said article by applying to the metallic surface of said article a solution comprising a mixture of:

(a) an amino-organosilane having at least one alkoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group.

(b) an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the amino-organosilane, and (c) a volatile organic diluent in which said amino-organosilane compound and epoxy compound are soluble, said amino-organosilane compound and said epoxy compound being present in said mixture in an amount up to about fifty percent by weight of said mixture and curing said finish on said metallic surface to form a cured finish of said mixture on said article and provide said article with improved corrosion resistance.

13. A process for improving the corrosion resistance of an article having a metallic surface which comprises the steps of finishing said article by applying to the metallic surface of said article a solution comprising a mixture of:

(a) a siloxane copolymer consisting essentially of units of the formula:

in which formula from 0.1 to 2 oxygen atoms per silicon atom are attached to alkyl groups so as to provide from 0.1 to 2 silicon-bonded alkoxy groups per silicon atom in the copolymer (b) a diglycidyl ether of 4,4'-dihydroxydiphenyl-2,2-propane said epoxy compound being present in an amount that provides from 0.05 to 5.0 epoxy equivalents for each amino hydrogen equivalent provided by the siloxane copolymer, and (c) a volatile organic diluent in which said siloxane copolymer and said diglycidyl ether of 4,4'-dihydroxydiphenyl-2,2-propane is soluble, said volatile organic diluent comprising an aromatic hydrocarbon and at least one member selected from the class consisting of hydrocarbon ethers, hydrocarbon alcohols and hydrocarbon alcohol-ethers, said siloxane copolymer and said epoxy compound being present in said mixture in an amount up to about seven and one-half percent by weight of said mixture, and curing said finish on said metallic surface to form a cured finish of said mixture on said article and provide said article with improved corrosion resistance.

14. A process for improving the corrosion resistance of an article having a metallic surface which comprises the steps of finishing said article by applying to the metallic surface of said article a solution comprising (I) a curable adduct of:

(a) an amino-organosilane having at least one alkoxy group bonded to silicon and having at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said alkoxy and divalent hydrocarbon groups being satisfied by a monovalent hydrocarbon group and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosilane, and (II) a volatile organic diluent in which said curable adduct is soluble, said curable adduct being present in said solution in an amount up to about seventy-five percent by weight of said solution, and curing said finish on said metallic surface to form a cured finish of said curable adduct on said metallic surface and provide said article with improved corrosion resistance.

15. A process for improving the corrosion resistance of an article having a metallic surface which comprises the steps of finishing said article by applying to the metallic surface of said article a solution comprising (I) a curable adduct of:

(a) a siloxane copolymer composed of aminoalkylsiloxane units having at least one amino nitrogen atom connected to a silicon atom thereof through not less than three carbon atoms of said aminoalkyl group and having from one to two amino hydrogen atoms bonded to said nitrogen atom and hydrocarbon siloxane units said siloxane copolymer containing from 0.1 to 2 silicon-bonded alkoxy groups per silicon atom, any valences of the silicon atoms in said siloxane copolymer that are not attached to oxygen atoms forming part of the siloxane chain, to said aminoalkyl groups, and to said alkoxy groups being attached to a member selected from the groups consisting of the monovalent hydrocarbon groups and the hydroxyl groups, and (b) an epoxy compound containing at least one pair of vicinal carbon atoms in which oxirane oxygen is attached, said epoxy compound being present in an amount that provides from 0.05 to 5.0 epoxy equivalents for each amino hydrogen equivalent provided by the siloxane copolymer, and (II) a volatile organic diluent in which said curable adduct is soluble, said volatile organic diluent comprising an aromatic hydrocarbon at least one member selected from the class consisting of hydrocarbon ethers, hydrocarbon alcohols and hydrocarbon alcohol-ethers said curable adduct being present in said solution in an amount up to about fifty percent by weight of said solution, and curing said finish on said metallic surface to form a cured finish of said curable adduct on said metallic surface and provide said article with improved corrosion resistance.

16. A process for improving the corrosion resistance of an article having a metallic surface which comprises the steps of finishing said article having a metallic surface which comprises the steps of finishing said article by applying to the metallic surface of said article a solution comprising (I), a curable adduct of:

(a) a siloxane copolymer consisting essentially of gamma-aminopropylsiloxane units and hydrocarbon siloxane units, said siloxane copolymer containing from 0.1 to 2 silicon-bonded alkoxy groups per silicon atom, any valences of the silicon atoms in said silioxane copolymer not attached to oxygen atoms forming part of the siloxane chain, said gamma-amino-propyl groups, and said alkoxy groups being attached to a member selected from the groups consisting of the monovalent hydrocarbon groups and the hydroxyl groups, and (b) a diglycidyl ether of 4,4'-dihydroxydiphenyl-2,2-propane, said epoxy compound being present in an amount that provides from 0.05 to 5.0 epoxy equivalents for each amino hydrogen equivalent provided by the siloxane copolymer, and (II) a volatile organic diluent in which said curable adduct is soluble, said volatile organic diluent comprising an aromatic hydrocarbon and at least one member selected from the class consisting of hydrocarbon ether, hydrocarbon alcohols and hydrocarbon alcohol-ethers, said curable adduct being present in said solution in an amount up to about ten percent by weight of said solution, and curing said finish on said metallic surface to form a cured finish of said curable adduct on said metallic surface and provide said article with improved corrosion resistance.

17. A process for improving corrosion resistance of an article having a silver surface which comprises the steps of finishing said article by applying to the silver surface of said article a solution comprising (I) a curable adduct of:

(a) a siloxane copolymer composed of aminoalkylsiloxane units having at least one amino nitrogen atom connected to a silicon atom thereof through not less than three carbon atoms of said aminoalkyl group and having from one to two amino hydrogen atoms bonded to said nitrogen atom and hydrocarbon siloxane units, said siloxane copolymer containing from 0.1 to 2 silicon-bonded alkoxy groups per silicon atom, any valences of the silicon atoms in said siloxane copolymer that are not attached to oxygen atoms forming part of the siloxane chain, to said aminoalkyl groups, and to said alkoxy groups being attached to a member selected from the groups consisting of the monovalent hydrocarbon groups and the hydroxyl groups, and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the siloxane copolymer, and (II) a volatile organic diluent in which said curable adduct is soluble, said volatile organic diluent comprising an aromatic hydrocarbon and at least one member selected from the class consisting of hydrocarbon ethers, hydrocarbon alcohols and hydrocarbon alcohol-ethers, said curable adduct being present in said solution in an amount up to about ten percent by weight of said solution, and curing said finish on said silver surface to form a cured finish of said curable adduct on said silver surface and provide said article with improved corrosion resistance.

18. An article of manufacture comprising a base member of a metallic surface having improved corrosion resistance, said article of manufacture comprising said base member of a metallic surface having thereon a finally cured finish of a resinous material comprising the reaction product of:

(a) an amino-organosilane having at least one hydrocarbonoxy group bonded to silicon and at least one amino nitrogen atom connected to silicon through not less than three carbon atoms of a divalent hydrocarbon group and from one to two amino hydrogen atoms bonded to said nitrogen atom, any valence of the silicon atom in said silane not satisfied by said hydrocarbonoxy and divalent hydrocarbon groups being satisfied by a monovalent hydrocarbon group and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosilane.

19. An article of manufacture comprising a base member of a metallic surface having improved corrosion resistance, said article of manufacture comprising said base member of a metallic surface having thereon a finally cured finish of a resinous material comprising the reaction product of:

(a) a siloxane copolymer consisting essentially of gamma-aminopropylsiloxane units and hydrocarbon siloxane, said siloxane copolymer containing from 0.1 to 2 silicon-bonded alkoxy groups per silicon atom, any valences of the silicon atoms in said siloxane copolymer not attached to oxygen atoms forming part of the siloxane chain, said gamma-aminopropyl groups, and said alkoxy groups being attached to a member selected from the groups consisting of the monovalent hydrocarbon groups and the hydroxyl groups, units and (b) a diglycidyl ether of 4,4'-dihydroxydiphenyl-2,2-propane in the proportions of 0.05 to 1.5 epoxy equivalent per amino hydrogen equivalent.

20. An article of manufacture comprising a base member of a metallic surface containing a metal selected from the class consisting of aluminum, beryllium, copper, chromium plate, iron, magnesium, nickel, lead, silver, tin, zinc, and alloys thereof having improved corrosion resistance, said article of manufacture comprising said base member of a metallic surface having thereon a finally cured finish of a resinous material comprising the reaction product:

(a) a siloxane copolymer composed of aminoalkylsiloxane units having at least one amino nitrogen atom connected to a silicon atom thereof through not less than three carbon atoms of said aminoalkyl group and having from one to two amino hydrogen atoms bonded to said nitrogen atom and hydrocarbon siloxane units said siloxane copolymer containing from 0.1 to 2 silicon-bonded alkoxy groups per silicon atom, any valences of the silicon atoms in said siloxane copolymer that are not attached to oxygen atoms forming part of the siloxane chain, to said aminoalkyl groups, and to said alkoxy groups being attached to a member selected from the groups consisting of the monovalent hydrocarbon groups and the hydroxyl groups, and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the siloxane copolymer.

21. An article of manufacture comprising a base member of a silver surface having improved corrosion resistance, said article of manufacture comprising said base member of a silver surface having thereon a finally cured finish of a resinous material comprising the reaction product of:

(a) a siloxane copolymer composed of aminoalkylsiloxane units having at least one amino nitrogen atom connected to a silicon atom thereof through not less than three carbon atoms of said aminoalkyl group and having from one to two amino hydrogen atoms bonded to said nitrogen atom and hydrocarbon siloxane units said siloxane copolymer containing from 0.1 to 2 silicon-bonded alkoxy groups per silicon atom, any valences of the silicon atoms in said siloxane copolymer that are not attached to oxygen atoms forming part of the siloxane chain, to said aminoalkyl groups, and to said alkoxy groups being attached to a member selected from the groups consisting of the monovalent hydrocarbon groups and the hydroxyl groups, and (b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the siloxane copolymer.

22. The process of claim 11 wherein the cured finish has a film thickness of from 0.02 mil to 0.2 mil.

23. A finishing composition comprising a mixture of an aminoalkylsilane having the formula:

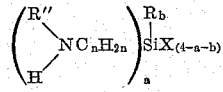

wherein X is an alkoxy group, R is a monovalent hydrocarbon radical, R" is a member selected from the class consisting of hydrogen and a monovalent hydrocarbon group, n is an integer from 3 to 9, a is an integer from 1 to 3, b is an integer from 0 to 2 and

is attached to carbon which is at least two carbons removed from silicon; an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the aminoalkylsilane; and an organic solvent.

24. The finishing composition of claim 23 wherein the mixture contains, as an additional component, a silane having the formula:

wherein R is a monovalent hydrocarbon radical, X is an alkoxy group and c is an integer from 0 to 3.

25. A process for improving the corrosion resistance of an article having a metallic surface, said process comprising (1) forming a reaction mixture containing an aminoalkylsilane having the formula:

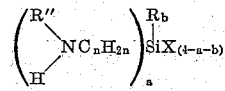

wherein X is an alkoxy group, R is a monovalent hydrocarbon radical, R" is a member selected from the class consisting of hydrogen and a monovalent hydrocarbon group, n is an integer from 3 to 9, a is an integer from 1 to 3, b is an integer from 0 to 2 and

is attached to carbon which is at least two carbons removed from silicon; an epoxy compound containing at least one pair of vicinal carbon atoms to which oxirane oxygen is attachecd said epoxy compound being present in an amount that provides from 0.05 to 5.0 epoxy equivalents for each amino hydrogen equivalent provided by the aminoalkylsilane; and an organic solvent; (2) applying the reaction mixture to the metallic surface of said article, and (3) allowing the reaction mixture to cure on the surface to produce a finish.

26. The process of claim 25 wherein the reaction mixture is partially reacted after it is formed and before it is applied to the metallic surface of said article.

27. An article of manufacture comprising a metallic base member having thereon a finally cured finish of a resinous material comprising the reaction product of a reaction mixture containing aminoalkylsilane having the formula:

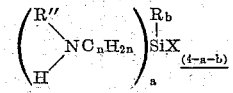

wherein X is an alkoxy group, R is a monovalent hydrocarbon radical, R" is a member selected from the class consisting of hydrogen and a monovalent hydrocarbon group, n is an integer from 3 to 9, a is an integer of from 1 to 3, b is an integer from 0 to 2 and

is attached to carbon which is at least two carbons removed from silicon; and an epoxy compound containing at least one pair of vicinal carbon atoms to which oxirane oxygen is attached said epoxy compound being present in an amount that provides from 0.05 to 5.0 epoxy equivalents for each amino hydrogen equivalent provided by the aminoalkylsilane.

28. The curable finishing composition of claim 2 wherein the volatile organic diluent comprises a mixture of liquid organic compounds, at least one of said liquid organic compounds being an alcohol.

29. A curable finishing composition comprising a relatively stable solution of:
(I) A member selected from the group consisting of:
(1) a mixture of:
(a) an amino-organosiloxane polymer having silicon atoms interconnected by oxysilicon bonds, having at least one aminonitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to an oxygen atom in said oxysilicon bonds, to said divalent hydrocarbon and to said alkoxy groups being attached to a member selected from the groups consisting of the monovalent hydrocarbon groups and the hydroxyl groups, the ratio of said amino-organo groups to any monovalent hydrocarbon groups in the polymer being at least 0.2 to 1;
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer, and
(2) curable adducts of (a) and (b); dissolved in
(II) a volatile organic diluent in which said adduct, amino-organosiloxane polymer and epoxy compound are soluble, said amino-organosiloxane polymer and said epoxy compound being present in said solution in an amount up to about seventy-five percent by weight of said solution.

30. A curable finishing composition comprising a mixture of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to an oxygen atom in said oxysilicon bonds, to said divalent hydrocarbon and to said divalent hydrocarbon and to said alkoxy groups being attached to a member selected from the groups consisting of the monovalent hydrocarbon groups and the hydroxyl groups, the ratio of said amino-organo groups to any monovalent hydrocarbon groups in the polymer being at least 0.2 to 1,
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer and
(c) a volatile organic diluent in which said amino-organosiloxane polymer and epoxy compound are soluble, said amino-organosiloxane polymer and said epoxy compound being present in said mixture in an amount from 1 to 10 percent by weight of said mixture, said mixture of said amino-organosiloxane polymer, said epoxy compound and said volatile organic diluent being in the form of a solution.

31. A curable finishing composition comprising a mixture of a curable adduct of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon-bonded alkoxy groups per silicon atom, any valences of silicon in said amino-organosiloxane polymer that are not attached to an oxygen atom in said oxysilicon bonds, to said divalent hydrocarbon and to said alkoxy groups being attached to a member selected from the groups consisting of the monovalent hydrocarbon groups and the hydroxyl groups, said amino-organosiloxane polymer having from 0.3 to 2 silicon-bonded amino-organo groups for each of any silicon-bonded hydrocarbon groups in the polymer, and
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer, and a volatile organic diluent in which said curable adduct is soluble, said curable adduct of said amino-organosiloxane polymer and said epoxy compound being present in said mixture in an amount from 1 to 10 percent by weight of said mixture, said mixture of said curable adduct of said amino-organo-siloxane polymer and said epoxy compound and said volatile organic diluent being in the form of a solution.

32. A process for preparing a finishing composition comprising a solution of a curable adduct of an amino-organosilicon compound and an epoxy compound which comprises the steps of forming a mixture of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to an oxygen atom in said oxysilicon bonds, to said divalent hydrocarbon and to said alkoxy groups being attached to a member selected from the groups consisting of the monovalent hydrocarbon groups and the hydroxyl groups said amino-organosiloxane polymer having from 0.3 to 2 silicon-bonded amino-organo groups for each of any silicon-bonded hydrocarbon groups in the polymer,
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer, and
(c) a volatile organic diluent in which said amino-organosiloxane polymer and epoxy compound are soluble, said mixture of said amino-organosiloxane polymer, said epoxy compound and said volatile organic diluent forming a solution, said amino-organosiloxane polymer and said epoxy compound being present in said mixture in an amount up to about seventy-five percent by weight of said mixture, subjecting said mixture to a temperature in the range.

of from about room temperature to the reflux temperature of said mixture to cause said amino-organosiloxane polymer and said epoxy compound present in said mixture to partially react to form a curable adduct and provide a solution comprising said curable adduct and said volatile organic diluent.

33. A process for improving the corrosion resistance of an article having a metallic surface which comprises the steps of finishing said article by applying to the metallic surface of said article a relatively stable solution comprising:
(1) a member selected from the group consisting of:
(1) mixture of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to an oxygen atom in said oxysilicon bonds, to said divalent hydrocarbon and to alkoxy groups being attached to a member selected from the groups consisting of the monovalent hydrocarbon groups and the hydroxyl groups, said amino-organosiloxane polymer having at least 0.2 of said amino-organo groups for each of any silicon-bonded hydrocarbon groups in the polymer, and
(b) an epoxy compound containing at least one pair of vicinal carbon atoms to which oxirane is attached, said epoxy compound being present in an amount that provides from 0.05 to 5.0 epoxy equivalents for each amino hydrogen equivalent provided by the amino-organosiloxane polymer, and
(2) curable adducts of (a) and (b) and
(II) a volatile organic diluent in which said adduct, amino-organosiloxane polymer and epoxy compound are soluble, said amino-organosiloxane polymer and said epoxy compound being present in said solution in an amount up to about fifty percent by weight of said solution, and curing said coating on said metallic surface to form a cured finish of said solution on said article and provide said article with improved corrosion resistance.

34. A process for improving the corrosion resistance of an article having a metallic surface which comprises the steps of finishing said article by applying to the metallic surface of said article a solution comprising a mixture of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to an oxygen atom in said oxysilicon bonds, to said divalent hydrocarbon and to said alkoxy groups being attached to a member selected from the groups consisting of the monovalent hydrocarbon groups and the hydroxyl groups, said amino-organosiloxane poylmer having from 0.3 to 2 of said silicon-bonded amino-organo groups for each of any silicon-bonded hydrocarbon groups in the polymer,
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer, and
(c) a volatile organic diluent in which said amino-organosiloxane polymer and epoxy compound are soluble, said amino-organosiloxane polymer and said epoxy compound being present in said mixture in an amount up to about fifty percent by weight of said mixture and curing said finish on said metallic surface to form a cured finish of said mixture on said article and provide said article with improved corrosion resistance.

35. A process for improving the corrosion resistance of an article having a metallic surface which comprises the steps of finishing said article by applying to the metallic surface of said article a solution comprising (I) a curable adduct of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that is not attached to an oxygen atom in said oxysilicon bonds, to said divalent hydrocarbon and to alkoxy groups being attached to a member selected from the groups consisting of the monovalent hydrocarbon groups and the hydroxyl groups, said amino-organosiloxane polymer having from 0.3 to 2 of said silicon-bonded amino-organo groups for each of any silicon-bonded hydrocarbon groups in the polymer, and
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer, and (II) a volatile organic diluent in which said curable adduct is soluble, said curable adduct being present in said solution in an amount up to about seventy-five percent by weight of said solution, and curing said finish on said metallic surface to form a cured finish of said curable adduct on said metallic surface and provide said article with improved corrosion resistance.

36. An article of manufacture comprising a base member of a metallic surface having improved corrosion resistance, said article of manufacture comprising said base member of a metallic surface having thereon a finally cured finish of a resinous material comprising the reaction product of:
(a) an amino-organosiloxane polymer having silicon atoms interconnected by oxysilicon bonds, having at least one amino nitrogen atom connected to silicon through not less than three carbon atoms of a divalent hydrocarbon group, having from 1 to 2 amino hydrogen atoms bonded to said nitrogen atom and having from 0.1 to 2 silicon bonded alkoxy groups per silicon atom, any valences of silicon in said amino-organosiloxane polymer that are not attached to oxygen atoms in said oxysilicon bonds, to said divalent hydrocarbon group and to alkoxy groups being attached to a member selected from the groups consisting of the monovalent hydrocarbon groups and the hydroxyl groups, said amino-organosiloxane polymer having at least 0.2 of said amino-organo groups for each of any silicon-bonded hydrocarbon groups in the polymer, and
(b) an epoxy compound containing at least one pair of vicinal carbon atoms to which oxirane oxygen is attached, said epoxy compound being present in an amount that provides from 0.05 to 5.0 epoxy equivalents for each amino hydrogen equivalent provided by the amino-organosiloxane polymer.

37. A curable finishing composition of claim 7 wherein the siloxane copolymer contains about 1.5 silicon bonded alkoxy groups per silicon atom.

38. A curable finishing composition of claim 7 wherein the siloxane copolymer contains about 2 silicon bonded alkoxy groups per silicon atom.

39. The curable finishing composition of claim 30 wherein the epoxy compound is represented by the formula:

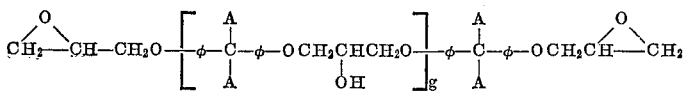

where A is a member selected from the group consisting of hydrogen and the alkyl groups, $\phi$ is a phenylene group and $g$ is a number proportional to the average chain length of the epoxy compound.

40. The curable finishing composition of claim 31 wherein the epoxy compound is represented by the formula:

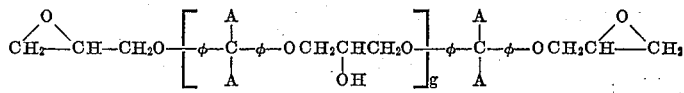

where A is a member selected from the group consisting of hydrogen and the alkyl groups, $\phi$ is a phenylene group and $g$ is a number proportional to the average chain length of the epoxy compound.

References Cited by the Examiner

UNITED STATES PATENTS

| | | | |
|---|---|---|---|
| 2,819,245 | 1/58 | Shorr | 260—42 |
| 2,981,711 | 4/61 | Meyer et al. | 260—33.6 |

Lee et al.: "Epoxy Resins," pub. July 31, 1957, by McGraw-Hill, pages 141–146.

LEON J. BERCOVITZ, *Primary Examiner.*

D. ARNOLD, WILLIAM H. SHORT, *Examiners.*